United States Patent
Allen et al.

(10) Patent No.: US 12,473,636 B2
(45) Date of Patent: Nov. 18, 2025

(54) ATOMIC LAYER DEPOSITION DERIVED PROTECTIVE COATINGS FOR CALCIUM FLUORIDE OPTICAL COMPONENTS

(71) Applicant: CORNING INCORPORATED, Corning, NY (US)

(72) Inventors: Donald Erwin Allen, Painted Post, NY (US); Gerald Philip Cox, Brockport, NY (US); Keith John Donohue, Fairport, NY (US); Ming-Huang Huang, Ithaca, NY (US); Hoon Kim, Horseheads, NY (US); Jue Wang, Pittsford, NY (US)

(73) Assignee: Corning Incorporated, Corning, NY (US)

( * ) Notice: Subject to any disclaimer, the term of this patent is extended or adjusted under 35 U.S.C. 154(b) by 505 days.

(21) Appl. No.: 17/965,122

(22) Filed: Oct. 13, 2022

(65) Prior Publication Data

US 2023/0123796 A1    Apr. 20, 2023

Related U.S. Application Data

(60) Provisional application No. 63/257,486, filed on Oct. 19, 2021.

(51) Int. Cl.
*C23C 16/40* (2006.01)
*C23C 16/455* (2006.01)

(52) U.S. Cl.
CPC ...... *C23C 16/403* (2013.01); *C23C 16/45536* (2013.01); *C23C 16/45553* (2013.01)

(58) Field of Classification Search
CPC ............ C23C 16/402; C23C 16/45536; C23C 16/45525; C23C 16/30; C23C 16/403; C23C 16/45553

See application file for complete search history.

(56) References Cited

U.S. PATENT DOCUMENTS

| | | | |
|---|---|---|---|
| 5,891,531 A * | 4/1999 | Konishi | C03B 19/1415 427/575 |
| 6,261,696 B1 | 7/2001 | Biro et al. | |
| 7,128,984 B2 | 10/2006 | Maier et al. | |
| 2006/0046099 A1 | 3/2006 | Maier et al. | |
| 2008/0278813 A1 | 11/2008 | Wilklow | |
| 2012/0269962 A1* | 10/2012 | Blomberg | C23C 16/409 427/126.3 |

(Continued)

FOREIGN PATENT DOCUMENTS

| | | |
|---|---|---|
| GB | 2431670 A | 5/2007 |
| JP | 2007-294979 A | 11/2007 |

(Continued)

OTHER PUBLICATIONS

Pilvi Study of a novel ALD process Jnl Matls Chem V17 p5077-83 2007 (Year: 2007).*

(Continued)

*Primary Examiner* — Joseph A Miller, Jr.
(74) *Attorney, Agent, or Firm* — Kevin L. Bray

(57) ABSTRACT

A coated optical component includes an optical component and a conformal coating. The optical component is crystalline calcium fluoride and the conformal coating is an atomic layer deposition (ALD) coating in contact with a surface of the optical component. The ALD coating includes a metal fluoride ALD coating having a metal different from calcium. The ALD coating can include other metal oxide or metalloid oxide ALD coating layers. The method for making the coated optical component includes depositing an atomic layer deposition (ALD) coating on a surface of the optical component, where the ALD coating can be a metalloid oxide, a metal oxide, a metal fluoride having a metal that is different from calcium, or combinations of these. Sulfur hexafluoride is used as a fluorine source in the ALD process.

8 Claims, 17 Drawing Sheets

(56) References Cited

U.S. PATENT DOCUMENTS

| | | | |
|---|---|---|---|
| 2015/0218700 A1* | 8/2015 | Nguyen | C23C 16/56 427/255.39 |
| 2015/0241605 A1 | 8/2015 | Cox et al. | |
| 2016/0260962 A1* | 9/2016 | Mane | H01M 4/1391 |
| 2021/0032744 A1 | 2/2021 | Huang et al. | |
| 2021/0132269 A1 | 5/2021 | Forcht et al. | |
| 2021/0293996 A1* | 9/2021 | Shklover | G02B 1/118 |

FOREIGN PATENT DOCUMENTS

| | | |
|---|---|---|
| WO | 2006/101856 A2 | 9/2006 |
| WO | 2012/074511 A2 | 6/2012 |

OTHER PUBLICATIONS

International Search Report and Written Opinion of the International Searching Authority; PCT/US2022/044790; mailed on Jan. 18, 2023, 11 pages; European Patent Office.

John Hennessy et al., "Atomic layer deposition of magnesium fluoride via bis(ethylcyclopentadienyl)magnesium and anhydrous hydrogen fluoride", Journal of Vacuum Science & Technology A, vol. 33, No. 1, Nov. 2014.

Vos et al; "Atomic layer deposition of aluminum fluoride using Al(CH3)3 and SF6 plasma"; Appl. Phys. Lett. 111, 113105 (2017), 7 pages.

* cited by examiner

ATOMIC LAYER DEPOSITION DERIVED PROTECTIVE COATINGS FOR CALCIUM FLUORIDE OPTICAL COMPONENTS

This application claims the benefit of priority under 35 U.S.C. § 119 of U.S. Provisional Application Ser. No. 63/257,486 filed on Oct. 19, 2021, the content of which is relied upon and incorporated herein by reference in its entirety.

FIELD

The present disclosure generally relates to optical components, more specifically, to optical components comprising coated calcium fluoride structures for deep ultraviolet (DUV) optics.

TECHNICAL BACKGROUND

Optical technology utilizing ultraviolet light is in wide use in semiconductor manufacturing. While extreme ultraviolet (EUV) based advanced lithography is developing, deep ultraviolet (DUV) based optical technology is still playing a dominant role in semiconductor manufacturing. Most DUV based optical lithography technologies demand laser-durable calcium fluoride ($CaF_2$) optics for the laser optics that enable high-power light sources and for the precision optics allowing high resolution inspection and pattern formation. Surface quality and surface flaw mitigation techniques help to improve the performance of $CaF_2$ optical components. The development of optical surfaces and coating technologies, such as PVD coatings, has enabled mitigation of surface defects and reduction in surface deterioration of $CaF_2$ optical components to extend the useful service lifetime of the $CaF_2$ optical components.

SUMMARY

According to a first aspect of the present disclosure, a coated optical component comprises an optical component comprising crystalline calcium fluoride and an atomic layer deposition (ALD) coating in contact with a surface of the optical component, the ALD coating comprising a metal fluoride having a metal different from calcium.

A second aspect of the present disclosure may include the first aspect, wherein the ALD coating may comprise magnesium fluoride ($MgF_2$).

A third aspect of the present disclosure may include either one of the first or second aspects, wherein the metal fluoride of the ALD coating may be coupled directly to the calcium fluoride of the optical component such that the metal fluoride of the ALD coating contacts the calcium fluoride at the surfaces of the optical component.

A fourth aspect of the present disclosure may include any one of the first through third aspects, wherein a thickness of the ALD coating may be less than or equal to 10 nanometers (nm).

A fifth aspect of the present disclosure may include any one of the first through fourth aspects, wherein the ALD coating may comprise a first ALD coating layer in direct contact with the surface of the optical component, the first ALD coating layer comprising the metal fluoride. The ALD coating may further comprise a second ALD coating layer in direct contact with the first ALD coating layer, wherein the second ALD coating layer comprises a material different from the first ALD coating layer.

A sixth aspect of the present disclosure may include the fifth aspect, wherein the first ALD coating layer may be magnesium fluoride and the second ALD coating layer may be silica ($SiO_2$) or alumina ($Al_2O_3$).

A seventh aspect of the present disclosure may include either one of the fifth or sixth aspects, wherein the first ALD coating layer may have a thickness less than 10 nanometers (nm) and the second ALD coating layer may have a thickness less than 10 nm.

An eighth aspect of the present disclosure may include any one of the first through seventh aspects, wherein the ALD coating may comprise an anti-reflective coating, where the anti-reflective coating may have a reflectivity of less than 1% over a wavelength range of from 190 nm to 266 nm, where the reflectivity refers to a fraction of incident beam power being reflected and returned from the anti-reflective coating.

A ninth aspect of the present disclosure may include any one of the first through eighth aspects, wherein the ALD coating may comprise sulfur.

A tenth aspect of the present disclosure may include the ninth aspect, wherein the ALD coating may comprise a sulfur content of greater than zero, such as from greater than zero ppm to 300 ppm.

An eleventh aspect of the present disclosure may include any one of the first through tenth aspects, wherein the ALD coating may be in contact with at least 95%, at least 98%, at least 99%, or at least 99.5% of optical surfaces of the optical component that are not masked.

A twelfth aspect of the present disclosure may include any one of the first through eleventh aspects, wherein the ALD coating may be a conformal coating.

A thirteenth aspect of the present disclosure may include any one of the first through twelfth aspects, wherein the ALD coating has a thickness that varies by less than or equal to 5% from an average thickness of the ALD coating, wherein the average thickness of the ALD coating is the thickness of the ALD coating averaged over the surface in contact with the ALD coating.

A fourteenth aspect of the present disclosure may include any one of the first through thirteenth aspects, wherein the ALD coating may comprise less than or equal to 1000 ppm carbon based on the total weight of the ALD coating.

A fifteenth aspect of the present disclosure may include any one of the first through fourteenth aspects, wherein the ALD coating may be in contact with at least 90%, at least 95%, at least 98%, at least 99%, or at least 99.5% of the surfaces of the optical component.

A sixteenth aspect of the present disclosure may include any one of the first through fifteenth aspects, wherein the optical component may be a prism, lens, beam splitter, or window.

A seventeenth aspect of the present disclosure may include any one of the first through sixteenth aspects, wherein the optical component may be a lens having a steepness ratio $R_c/\#$ of from 0.5 to 0.85, where the steepness ratio $R_c/\#$ is equal to a radius of curvature ($R_c$) of the steep surface divided by a diameter (#) of the clear aperture of the optical component.

An eighteenth aspect of the present disclosure may include a method of coating an optical component. The method may comprise depositing an atomic layer deposition (ALD) coating on a surface of the optical component. The optical component may comprise crystalline calcium fluoride ($CaF_2$), and the ALD coating may comprise a metalloid oxide, a metal oxide, a metal fluoride having a metal that is different from calcium, or combinations of these.

A nineteenth aspect of the present disclosure may include the eighteenth aspect, wherein the ALD coating may comprise the metal fluoride and depositing the ALD coating may comprise exposing the surface of the optical component to alternating pulses of a metal precursor and a fluorine source.

A twentieth aspect of the present disclosure may include the nineteenth aspect, wherein the fluorine source may be selected from the group consisting of sulfur hexafluoride ($SF_6$), nitrogen trifluoride ($NF_3$), trifluoroiodomethane ($CF_3I$), hydrogen fluoride (HF), and combinations of these.

A twenty-first aspect of the present disclosure may include either one of the nineteenth or twentieth aspects, wherein the fluorine source may comprise sulfur hexafluoride ($SF_6$).

A twenty-second aspect of the present disclosure may include any one of the nineteenth through twenty-first aspects, wherein the fluorine source may comprise a plasma formed from sulfur hexafluoride.

A twenty-third aspect of the present disclosure may include any one of the nineteenth through twenty-second aspects, wherein the metal precursor may comprise a metal ligand complex comprising magnesium.

A twenty-fourth aspect of the present disclosure may include any one of the nineteenth through twenty-third aspects, wherein the metal precursor may be selected from the group consisting of bis(ethylcyclopentadienyl)magnesium, bis(cyclopentadienyl)magnesium, bis(2,2,6,6-tetramethyl-3,5-heptanedionato)magnesium, bis(N,N'-di-sec-butylacetamidinato) magnesium, bis(pentamethylcyclopentadienyl)magnesium, and combinations of these.

A twenty-fifth aspect of the present disclosure may include any one of the nineteenth through twenty-fourth aspects, wherein the exposing the surface of the optical component to alternating pulses of a metal precursor and a fluorine source may comprise exposing the surface of the optical component to the pulse containing the metal precursor, The metal precursor may react with the calcium fluoride at the surface of the optical component to deposit a monolayer of ligated metal on the surface of the optical component. The method may further include ceasing the pulse containing the metal precursor and exposing the surface of the optical component to the pulse containing the fluorine source. The fluorine source may react with the monolayer of ligated metal to form the metal fluoride. The method may further include ceasing the pulse containing fluorine source.

A twenty-sixth aspect of the present disclosure may include the twenty-fifth aspect, further comprising repeatedly exposing the surface to the alternating pulses of a metal precursor and a fluorine source to increase a thickness of the ALD coating.

A twenty-seventh aspect of the present disclosure may include either one of the twenty-fifth or twenty-sixth aspects, further comprising after ceasing the pulse containing the metal precursor and before the exposing the surface of the optical component to the pulse containing the fluorine source, exposing the surface to a pulse containing an oxygen source. The oxygen source may comprise water, water plasma, oxygen, oxygen plasma, ozone, ozone plasma, hydrogen peroxide, hydrogen peroxide plasma, oxygen-containing liquid, oxygen-containing gas, or combinations of these. The oxygen source may cause oxidation of the ligated metal to form a metal oxide. The method may further include ceasing the pulse containing the oxygen source. After the pulse containing the oxygen source, the fluorine source may reduce the metal oxide to form the metal fluoride.

A twenty-eighth aspect of the present disclosure may include the twenty-seventh aspect, wherein the pulse containing the oxygen source may remove carbon from the monolayer of ligated metal.

A twenty-ninth aspect of the present disclosure may include the eighteenth aspect, wherein the ALD coating may comprise the metal oxide and the depositing the ALD coating on the surface of the optical component may comprise exposing the surface to alternating pulses of a metal precursor and an oxygen source.

A thirtieth aspect of the present disclosure may include the twenty-ninth aspect, wherein the oxygen source may be selected from the group consisting of water, water plasma, ozone, ozone plasma, oxygen, oxygen plasma, hydrogen peroxide, hydrogen peroxide plasma, oxygen-containing gases, oxygen-containing liquids, and combinations of these.

A thirty-first aspect of the present disclosure may include any one of the twenty-ninth through thirtieth aspects, wherein the metal precursor may comprise an aluminum precursor selected from the group consisting of trimethylaluminum (TMA), triethylaluminum (TEA), and combinations of these.

A thirty-second aspect of the present disclosure may include the eighteenth aspect, wherein the ALD coating may comprise the metalloid oxide and the depositing the ALD coating on the surface of the optical component may comprise exposing the surface of the optical component to alternating pulses of a metalloid precursor and an oxygen source.

A thirty-third aspect of the present disclosure may include the thirty-second aspect, wherein the oxygen source may be selected from the group consisting of water, water plasma, ozone, ozone plasma, oxygen, oxygen plasma, hydrogen peroxide, hydrogen peroxide plasma, oxygen-containing gases, oxygen-containing liquids, and combinations of these.

A thirty-fourth aspect of the present disclosure may include either one of the thirty-second or thirty-third, wherein the metalloid oxide may be silica and the metalloid precursor may be selected from the group consisting of bis(tert-butylamino)silane; di(sec-butylamino)silane; diisopropylaminotrisilylamine; a compound having formula $SiH_2(NRR')_2$, where R and R' are each independently a methyl group, an ethyl group, or both; and combinations of these.

A thirty-fifth aspect of the present disclosure may include any one of the eighteenth through thirty-fourth aspects, comprising depositing the ALD coating on the surfaces of the optical component at a process temperature of from 120° C. to 250° C.

A thirty-sixth aspect of the present disclosure may include any one of the eighteenth through thirty-fifth aspects, wherein the depositing of the ALD coating comprises applying a first ALD coating layer to a surface of the optical component and applying a second ALD coating layer onto the first ALD coating layer, where the second ALD coating layer comprises a material different from the first ALD coating layer.

A thirty-seventh aspect of the present disclosure may include the thirty-sixth aspect, wherein the first ALD coating layer may comprise a metal fluoride and the second ALD coating layer may comprise silica or alumina.

A thirty-eighth aspect of the present disclosure may include any one of the eighteenth through thirty-seventh aspects, wherein the depositing the ALD coating may be performed without rotating the optical component.

A thirty-ninth aspect of the present disclosure may include any one of the eighteenth through thirty-eighth aspects, wherein the method does not include holding the optical component in a fixture.

A fortieth aspect of the present disclosure may include any one of the eighteenth through thirty-ninth aspects, wherein the optical component comprises a plurality of the surfaces and the depositing atomic layer deposition (ALD) is performed simultaneously on at least two of the plurality of the surfaces.

Additional features and advantages of the optical components, ALD coatings, and methods of coating the optical components with the ALD coatings described herein will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
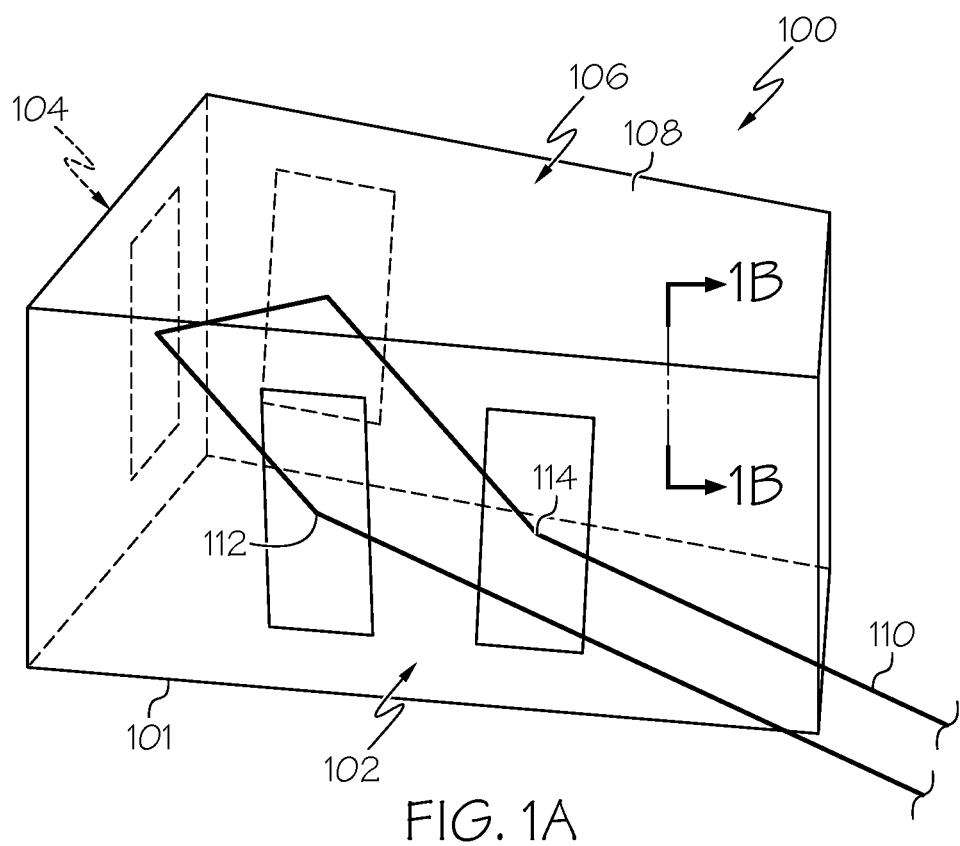
FIG. 1A schematically depicts a perspective view of a prism, according to one or more embodiments shown and described herein.
Figure 1B:
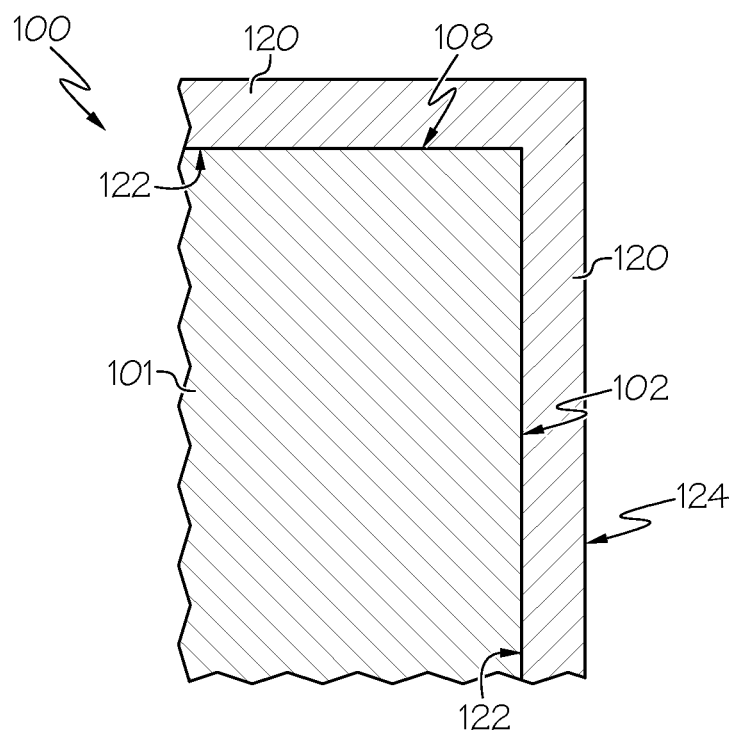
FIG. 1B schematically depicts a cross-section of a portion of the prism of FIG. 1A taken along reference line 1B-1B, according to one or more embodiments shown and described herein.

Reference will now be made in detail to various embodiments of the optical components and ALD coatings of the present disclosure, examples of which are schematically depicted in the accompanying drawings. Whenever possible, the same reference numerals will be used throughout the drawings to refer to the same or like parts. Referring now to FIGS. 1A and 1B, one embodiment of a coated optical component 100, according to the present disclosure, is schematically depicted. Referring to FIG. 1B, the coated optical component 100 includes an optical component 101 comprising crystalline calcium fluoride and a conformal coating in contact with a surface of the optical component 101. The conformal coating is an ALD coating 120 in contact with the surface of the optical component 101. The ALD coating 120 may be, a metal oxide, a metalloid oxide, a metal fluoride having a metal different from calcium, or combinations of these. In embodiments, the ALD coating 120 may be a magnesium fluoride ALD coating.

The coated optical component 100 may be prepared by a method that may include depositing the atomic layer deposition (ALD) coating 120 on surfaces of the optical component 101. The optical component 101 may comprise crystalline calcium fluoride (CaF$_2$), and the ALD coating 120 may comprise a metalloid oxide, a metal oxide, a metal fluoride having a metal that is different from calcium, or combinations of these. In embodiments, the ALD coating 120 may include a metal fluoride ALD coating, and the method may include exposing the surfaces of the optical component 101 to alternating pulses of a metal precursor and a fluorine source. In embodiments, the fluorine source may be an SF$_6$-based fluorine source, and the ALD process may include an additional oxygen source pulse to convert the metal precursor to metal oxide, which may then be converted to the metal fluoride by the subsequent fluorine source. The ALD coating 120 may also include a metal oxide ALD coating, metalloid oxide ALD coating, or both.

Various embodiments of the coated optical components 100 having the ALD coating 120 formed thereon and methods of coating optical components with the ALD coatings 120 to produce the coated optical components 100 will be described herein with specific reference to the appended drawings.

As used herein, the term "substantially free" of a constituent may refer to a composition, fiber, or atmosphere that includes less than 0.01 percent by weight or by mole of the constituent. For example, an ALD coating that is substantially free of carbon may include less than 0.01 percent by weight or by mole carbon.

The terms "microns" and "μm" are used interchangeably herein. The terms "nanometers" and "nm" are used interchangeably herein.

As used herein, the term "plasma" refers to a gas of ions that includes positive ions and electrons, and is generated from a starting material through application of heat and an electric current.

As used herein, the term "ppm" means parts per million on a molar basis and represents an atomic concentration. For example, a layer of MgF$_2$ with 1 ppm carbon includes 1 mole of carbon per million moles of MgF$_2$.

As used herein, the term "conformal coating" refers to a coating that conforms to the contours of the surfaces of an articles and has generally uniform thickness over all of the surfaces contacted by the coating.

Laser-durable calcium fluoride (CaF$_2$) optics enable use of high-power light sources for semiconductor fabrication and provide precision optics that allow high-resolution inspection and pattern formation. Surface quality and surface flaw mitigation techniques can improve the performance of CaF$_2$ optical components. The development of these surface treatment techniques has enabled mitigation of surface defects and reduction in surface deterioration of CaF$_2$ optical components to extend the useful service lifetime of the CaF$_2$ optical components. Such surface flaw mitigation techniques have included subsurface damage (SSD) detection and SSD-free surface finishing processes; surface cleaning technologies such as but not limited to megasonic cleaning, ultraviolet ozone (UVO) cleaning and reactive plasma cleaning; and physical vapor deposition (PVD) based protective coatings for CaF$_2$ components (PCCF).

In particular, protective PVD-based coatings are being applied to total internal reflection (TIR) surfaces and Brewster angle surfaces (input/output surfaces) of CaF$_2$ prisms and surfaces of other CaF$_2$ optical components, such as lenses, windows, and the like, to prolong the lifetime of the CaF$_2$ optical components. Currently, all the protective coatings are based on PVD coating processes. Examples of these PVD-based coatings can include, but are not limited to, silica PVD coatings or a combination of a magnesium fluoride (MgF$_2$) PVD coating with a silica PVD coating applied on top of the MgF$_2$ PVD coating. The total thickness of these PVD coatings are generally greater than 50 nanometers (nm), or even greater than 60 nm. These thickness ranges for PVD coatings are necessary to make sure the surface is sealed by the PVD coating within the coated area and no gaps or pinholes exist in the PVD coating.

While these developed technologies, in particular the PVD coatings, have been successfully employed in many laser optics and precision optics applications, these PVD coatings can be challenging to properly apply to CaF$_2$ prisms and optical components having steeply curved surfaces. These types of optical components (prisms and components with steeply curved surfaces) have features that present challenging problems compared to some windows and lenses. In particular, prisms can have multiple surfaces requiring coatings. Additionally, prisms can be small in size and have complex shapes, which are necessitated by the Brewster angle and the positioning of the TIR surfaces of the prisms.

These features and characteristics of CaF$_2$ prisms bring additional challenges for making laser-durable optics via PVD-based coating processes. For instance, multiple PVD coating runs are generally required in order to complete protective coatings on CaF$_2$ prisms. Additionally, the use of fixtures for holding the prisms and high-speed rotation of the prisms at elevated temperatures in the PVD process can create mechanical stability issues and surface cleanliness issues. These mechanical stability and surface cleanliness issues can increase the risk of causing mechanical and thermal damage to the optical component during the PVD coating process. Referring now to FIGS. 2A-2D, various configurations of tooling fixtures 20 of the prior art for holding and rotating optical components 10 during PVD coating are schematically depicted. The tooling fixtures 20 generally include a rotatable base 22 and one or more support features 24 that contact the optical component 10 to secure the optical component 10 while rotating the optical component during the PVD coating process. The tooling fixtures 20 used for PVD coating present a high risk of scratching the precisely polished optical surfaces of the optical components 10 due to contact with the tooling fixtures 20 at a high rotational speed. The PVD coating process may also have a greater risk of particle contamination and have a high re-work ratio of the prisms due to multiple surface coatings, multiple events of pump-to-venting, and surface cleaning and re-cleaning. PVD-based protective coatings can also have inconsistent coating thickness, which can limit the minimum thickness required to achieve the desired average thickness and hermetical seal capabilities of the PVD-based protective coatings.

In addition to prisms, optical components with steeply curved surfaces can also present challenges for PVD coatings, such as protective coatings, high performance anti-reflective (AR) coatings, and the like, over a wide angle range and/or a broad spectral bandwidth. As used throughout the present disclosure, an "anti-reflective coating" may refer to a coating that has a reflectivity of less than 1%, where "reflectivity" refers to the fraction of incident beam power being reflected and returned from a given surface. The reflectivity ($R_X$) of a surface can be expressed as $Rx=P_r/P_0$, where $P_0$ is the incident beam power and $P_r$ is the power of the beam being returned from the surface.

Current PVD processes produce poor thickness uniformity on steeply curved surfaces due to the changing line of sight between the vapor stream of the PVD coating process and the points on the steeply curved surface. Thus, PVD coating processes are not able to provide a conformal coating that is uniform over all coated surfaces of the optical component. To address this issue, complicated motion and screening of the target surface is often used to apply coatings with more consistent thickness. However, complicated motion and screening greatly increases the processing time and cost of PVD coating the steeply curved surfaces.

The coated optical components and methods of the present disclosure overcome these problems by applying conformal coatings to the surfaces of optical components, such as prisms and optical components having steeply curved surfaces, using an atomic layer deposition process to produce the coated optical components. The coated optical components of the present disclosure may include an optical component comprising, consisting of, or consisting essentially of calcium fluoride. The calcium fluoride can be crystalline calcium fluoride. The coated optical components further include a conformal coating comprising an ALD coating in contact with one or more surfaces of the optical component. The ALD coating may include a metal oxide, a metalloid oxide, a metal fluoride having a metal different from calcium, or combinations of these. In embodiments, the ALD coating can include magnesium fluoride ($MgF_2$) (e.g., an $MgF_2$ ALD coating). Additionally or alternatively, in embodiments, the ALD coating may include a silica ALD coating, an alumina ALD coating, or combinations of these. Methods of applying the ALD coating to the article to produce the coated optical component are also disclosed herein.

The ALD coating process can enable all of the surfaces of the optical component to be coated in a single deposition run with atomic layer precision. In other words, ALD coating processes can enable conformal coating of all surfaces of the optical component simultaneously. The ALD coating process can produce atomically dense, pin-hole-free films even at very small thickness, such as thicknesses down to a few nanometers. Thus, the ALD coating process can reduce the thickness of coatings, such as but not limited to protective coatings and anti-reflective (AR) coatings, by to less than ⅕ the thickness of the PVD-based coatings. The ALD coatings can enable control of the coating thickness down to a few nanometers, such as less than or equal to 10 nm. The ALD coating process can reduce coating stress and increase the lifetime of the coated optical components. In particular, the ALD coating seals the calcium fluoride to reduce depletion of fluoride ions from the surface of the calcium fluoride. The ALD coating process may also improve product yield and reduce re-work rate, among other features.

Referring again to FIGS. 1A and 1B, a coated optical component 100 is schematically depicted. Referring to FIG. 1B, the coated optical component 100 comprises an optical component 101 and an ALD coating 120 applied to surfaces (e.g., first surface 102, TIR surfaces 104 and 106, top surface 108, etc.) of the optical component 101. The optical component 101 may be a prism, lens, objective lens, window, or other type of optical component. The optical component 101 can be a structure made from calcium fluoride ($CaF_2$). In embodiments, the optical component 101 may comprise, consist of, or consist essentially of crystalline $CaF_2$. The optical component 101 can be small in size, such as having a largest dimension as small as 10 mm, and can have a complex shape. Optical components 101 having complex shapes may include optical components having multiple faceted sides, such as prisms, beam splitters, windows or the like, or optical components having steeply curved surfaces, such as but not limited to high numeric aperture objective lenses or other lenses.

In embodiments, the optical component 101 can be a prism having a plurality of sides. Referring to FIGS. 1A-1D, one embodiment of a coated optical component 100 comprising a prism as the optical component 101 is schematically depicted. The coated optical component 100 in FIG. 1A is a calcium fluoride ($CaF_2$) prism configured as an argon fluoride laser beam reverser. The coated optical component 100 of FIGS. 1A-1D has a first surface 102, which is a Brewster angle surface configured to allow a laser beam 110 to pass into and out of the prism at the Brewster angle. The coated optical component 100 may have a first TIR surface 104 and a second TIR surface 106 that are configured to reflect the laser beam 110 traveling through prism back into the prism. The first TIR surface 104 and the second TIR surface 106 may be angled and positioned to reflected the laser beam 110 from the first TIR surface 104 to the second TIR surface 106, and then from the second surface 106 back through the first surface 102. The angle of incidence (AOI) of the laser beam 110, the Brewster angle of the calcium fluoride, and the angle of the first TIR surface 104 and the second TIR surface 106 are designed to cause the laser beam 110 to follow a specific pathway through the prism and may cause the coated optical component 100 to have a complex shape with sides having specific non-normal angles relative to other sides of the coated optical component 100.

Figure 3A:
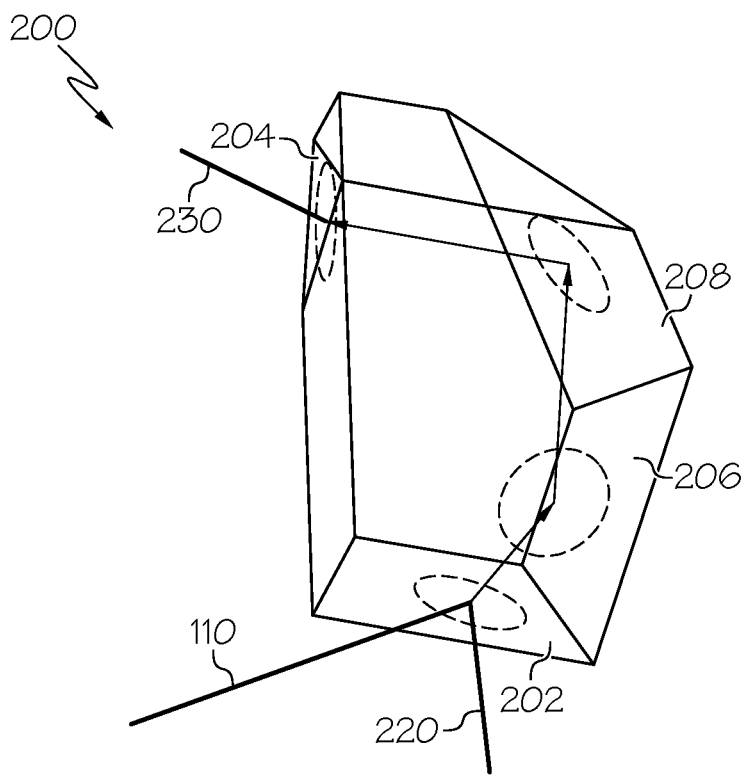
FIG. 3A schematically depicts a perspective view of another prism, according to one or more embodiments shown and described herein.
Figure 3B:
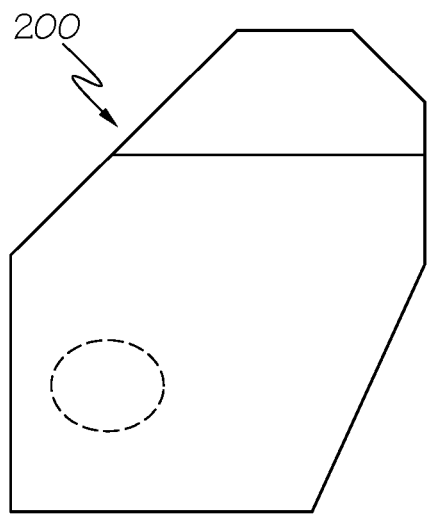
FIG. 3B schematically depicts a front view of a first total internal reflection (TIR) surface of the prism of FIG. 3A, according to one or more embodiments shown and described herein.
Figure 3C:
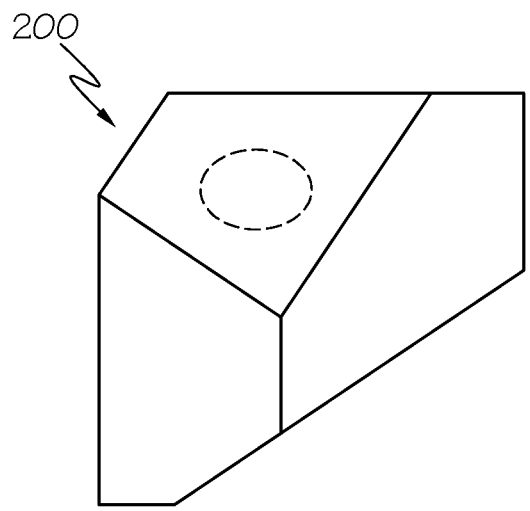
FIG. 3C schematically depicts a front view of a second TIR surface of the prism of FIG. 3A, according to one or more embodiments shown and described herein.

Referring now to FIGS. 3A-3C, another embodiment of a coated optical component 200 comprising a prism is schematically depicted. The coated optical component 200 of FIGS. 3A-3C comprises a small and complex-shaped $CaF_2$ corner prism configured to operate at a laser wavelength of 213 nm. Referring to FIG. 3A, the coated optical component 200 has 4 optical surfaces, which include an entrance surface 202 and an exit surface 204 at the Brewster angle, a first TIR surface 206 at an angle of incidence of 56.1°, and a second TIR surface 208 having an angle of incidence of 45°. The Brewster angle and angles of incidence of the two TIR surfaces 206, 208 result in the coated optical component 200 having a complex multi-faceted shape. FIGS. 3B and 3C schematically depict two sides of the coated optical component 200 of FIG. 2 and show the complex shape of the coated optical component 200.

Figure 4:
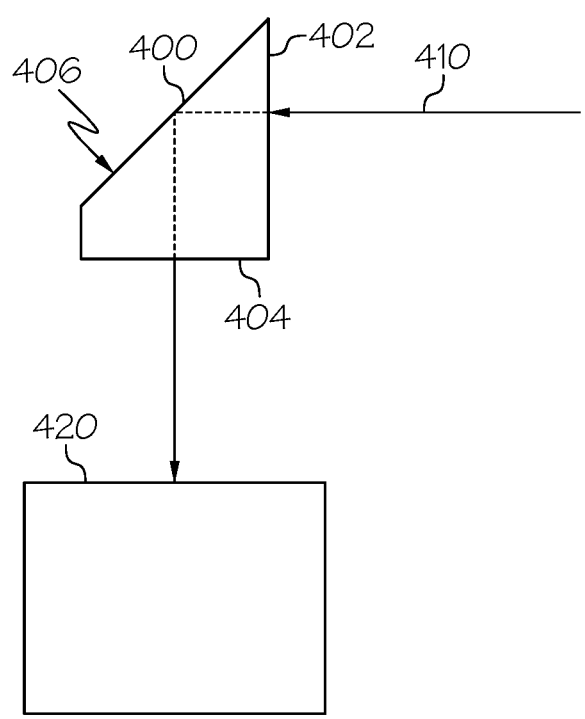
FIG. 4 schematically depicts a side view of a right angle prism, according to one or more embodiments shown and described herein.

Referring now to FIG. 4, another embodiment of a coated optical component 400 comprising a right angle prism is schematically depicted. The coated optical component 400 in FIG. 4 may be configured to reflect a beam 410 of light, such as but not limited to a laser beam having a wavelength of 266 nm, into an inspection device 420, such as an inspection objective lens. The coated optical component 400 of FIG. 4 may include an entrance surface 402, an exit surface 404, and at least one TIR surface 406. The TIR surface 406 may reflect at least a portion of the beam 410 of light from its pathway, through the exit surface 404, to the inspection device 420. The coated optical component 400 of FIG. 4 comprising the right angle prism can also have a complex shape.

Figure 5:
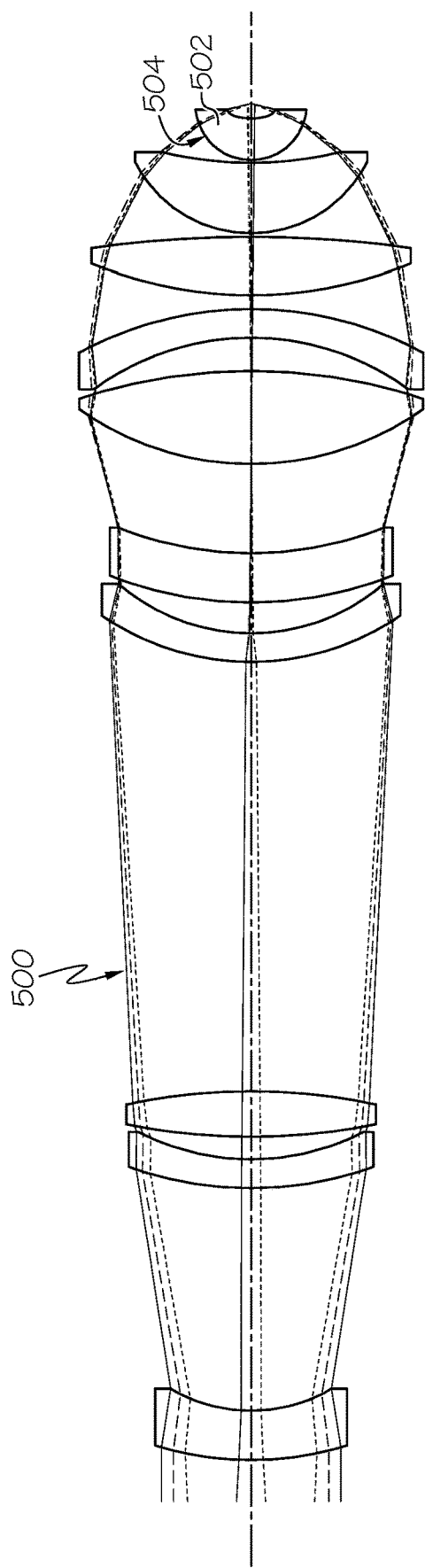
FIG. 5 schematically depicts a side view of an optical inspection system having a high numerical aperture objective lens, according to one or more embodiments shown and described herein.

Referring now to FIG. 5, an optical inspection system 500 for optical inspection using DUV or broadband spectral wavelengths is schematically depicted. The optical inspection system 500 can include many different elements, such as lenses, windows, prisms, beam splitters, wavelength filters, mirrors, etc. that may have small sizes and complex shapes. In particular, the optical inspection system may include a high numerical aperture (NA) objective lens 502, which may have one or more surfaces 504 having a very steep curvature. The steepness of the curvature of the surfaces 504 can be characterized by a steepness ratio $R_c/\#$ of the radius of curvature ($R_c$) of the steep surface divided by a diameter (#) of the clear aperture of the optical component. A surface 504 having a steam curvature may have a steepness ratio $R_c/\#$ of from 0.75 to 0.85. A surface 504 having a very steep curvature may have a steepness ratio $R_c/\#$ of less than 0.75, such as from 0.5 to 0.75. Other features of optical inspection systems may also have steeply curved surfaces. As previously discussed, these steeply curved surfaces can create challenges in applying anti-reflective and other coatings using PVD processes. In particular, the steeply curved surfaces create line-of-sight issues during the PVD coating process, which can lead to poor coating uniformity and/or necessitate complicated process modifications such as repositioning the element as the PVD coating is applied to the steeply curved surface. In particular, when the steepness ratio $R_c/\#$ of a curved surface is less than 1, the PVD coating process may produce a PVD coating that has a thickness falloff of greater than 5% over the curved surface. This thickness variance due to falloff increases with increasing steepness of the curvature of the curved surface. Thus, PVD processes are not able to apply conformal coatings to steeply curved or irregular surfaces.

The ALD coating 120 and ALD process for producing the coating will now be described with reference to the coated optical component of FIGS. 1A-1D. However, it is understood that the ALD coating 120 and ALD processes disclosed herein may be applied with equal success on any of optical components in FIGS. 3A-3C, 4, and 5, as well as any other optical components. The ALD coating 120 and/or ALD coating processes disclosed herein may also be applied to $CaF_2$ articles of types other than optical components.

Referring now to FIG. 1B, the coated optical component 100 comprises one or more ALD coatings 120 deposited onto the surface(s) of the optical component 101 so that the ALD coatings 120 are in contact with one or more of the surfaces of the optical component 101. In embodiments, the ALD coating 120 may be a protective coating that may provide a barrier on the surface(s) of the optical component 101 operable to reduce or prevent erosion of $CaF_2$ from the surface(s) of the optical component 101. In embodiments, the ALD coating 120 may be an anti-reflective coating. The ALD coating 120 may include a metal oxide, a metalloid oxide, a metal fluoride having a metal different from calcium, or combinations of these. In embodiments, the ALD coating 120 can be a magnesium fluoride ($MgF_2$) ALD coating or coating layer. In embodiments, the ALD coating 120 may comprise other high reflective index fluorides, such as but not limited to, lanthanum fluoride ($LaF_3$) ALD coatings or gadolinium fluoride ($GdF_3$) ALD coatings. Additionally or alternatively, in embodiments, the ALD coating may include a silica coating, an alumina coating, or combinations of these.

Figure 6:
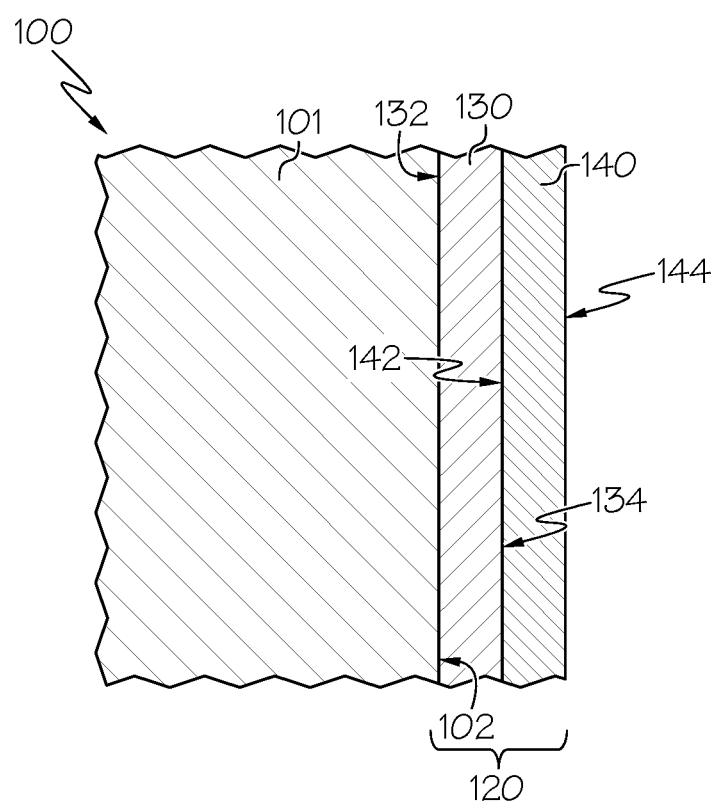
FIG. 6 schematically depicts a cross-sectional view of a portion of a coated optical component having a first ALD coating layer comprising a metal fluoride ALD coating and a second ALD coating layer or layers comprising oxide ALD coatings deposited on top of the first ALD coating layer, according to one or more embodiments shown and described herein.

In embodiments, the coated optical component 100 may include the ALD coating 120 that comprises magnesium fluoride ($MgF_2$). $MgF_2$ ALD coatings are well-suited for coated optical components 100 for deep ultraviolet (DUV) optical applications due to the low refractive index, high transmittance, and chemical and mechanical stability of the $MgF_2$ ALD coatings at laser wavelengths in the deep ultraviolet range, such as but not limited to wavelengths of from 193 to 266 nm. The $MgF_2$ ALD coatings may also be suitable for use with wavelength ranges greater than 266 nm. When the ALD coating 120 is a metal fluoride ALD coating, such as but not limited to an $MgF_2$ ALD coating, the metal fluoride compounds of the ALD coating 120 may be coupled directly to the $CaF_2$ of the optical component 101 such that the metal fluoride of the ALD coating 120 contacts the $CaF_2$ at the surfaces of the optical component 101. As used herein, the term "coupled directly to" means that the ALD coating 120 contacts and is bonded to the surface of the optical component 101 without any intervening coating or layer disposed between the ALD coating 120 and the surface of the optical component 101. In embodiments, the coated optical component 100 may comprise a metal fluoride ALD coating, such as but not limited to an $MgF_2$ ALD coating, and does not include an alumina coating disposed between the $CaF_2$ of the optical component 101 and the metal fluoride of the ALD coating 120. In embodiments, the ALD coating 120 may include a silica ALD coating, an alumina ALD coating, or both. Referring now to FIG. 6, the coated optical component 100 may include an ALD coating 120 comprising a plurality of ALD coating layers (e.g., first ALD coating layer 130, second ALD coating layer 140, etc.) applied to the surfaces of the optical component 100.

Referring again to FIG. 1B, the ALD coatings 120 may be applied to the surface(s) of the optical component 101 through an atomic layer deposition (ALD) process. During the ALD process, the optical component 101 is exposed to alternating pulses of one or more precursor compounds, where exposure to the alternating pulses of the precursor compounds causes layer-by-layer deposition of the ALD coating 120 on the surface(s) of the optical component 101, with each layer having a thickness comparable to a size of a single molecule of the ALD coating material (e.g. monolayer coverage of the surface(s)). The ALD process can enable coating all the surfaces of the optical component 101 in a single deposition run with atomic layer precision. A first precursor may be a metal precursor or metalloid precursor, and a second precursor may be a reducing compound (e.g., a fluorine source), an oxidizing compound (e.g., oxygen source), or a combination thereof. In embodiments, the ALD process may include a first pulse of a first precursor comprising a metal precursor or metalloid precursor, a second pulse of a second precursor comprising an oxygen source, and a third pulse of a third precursor comprising a fluorine source.

In embodiments, the ALD process may be a direct reduction ALD process, during which a metal precursor or metalloid precursor is deposited onto the surfaces of the optical component 101 and then directly reduced using a reducing agent, such as a fluorine source, to produce the ALD coating. When the ALD coating 120 is a metal fluoride ALD coating, the ALD process for applying the ALD coating 120 may include exposing the surfaces of the optical component 101 to alternating pulses of a metal precursor and a fluorine source. Exposing the surfaces to the alternating pulses of the metal precursor and fluorine source may be conducted in an ALD chamber, which may be a sealed chamber. The pulse of the metal precursor may include the metal precursor. In some embodiments, the pulse of the metal precursor may include the metal precursor and one or more inert gases. Inert gases may include non-reactive gases, such as but not limited to noble gases (e.g., Ar, He, Ne, etc.). The inert gas may act as a carrier for transporting the precursors into the ALD chamber. The pulse of each of the metal precursor and the fluorine source may be of sufficient time duration to enable the metal precursor and fluorine source, during their respective pulses, to react with at least 90%, at least 95%, at least 98%, at least 99%, or even at least 99.9% of the reaction sites at the surfaces of the optical component 101 or outer surfaces of the previously applied metal precursor or coating layer. Between injection of each pulse of metal precursor and fluorine source, the ALD chamber may be purged with an inert gas (e.g., Ar, He, Ne, etc.) to remove any residual metal precursor and/or fluorine source prior to the next pulse.

In embodiments, the ALD coating 120 may be a metal fluoride coating, and the ALD process may include exposing the surfaces of the optical component 101 to the pulse containing the metal precursor, purging the chamber after the metal precursor pulse, and then exposing the optical component 101 to a subsequent pulse of the fluorine source. During the pulse of the metal precursor, the metal precursor, in vapour, plasma, or atomized liquid form, may be injected into the ALD chamber containing the optical component 101. The ALD process may further include heating the metal precursor, such as the magnesium precursor, to a temperature greater than or equal to 95° C. prior to introducing the metal precursor to the optical component in the ALD chamber. Exposing the surfaces of the optical component to the pulse containing the metal precursor may cause the metal precursor to react with the calcium fluoride at the surfaces of the optical component 101 to bond a single layer of ligated metal on the surfaces of the optical component 101.

The single layer of ligated metal bonded to the surface may have a thickness approximately equal to a size of a single molecule of the ligated metal. For pulses of the metal precursor subsequent to the initial coating layer, the metal precursor may react with the previously deposited metal fluoride to bond a subsequent single layer of ligated metal to the outer surface of the previously deposited ALD coating 120. After depositing and bonding the single layer of ligated metal to the outer surface of the optical component 101, the ALD coating process may further include ceasing exposure of the optical component 101 to the metal precursor. Ceasing exposure of the optical component 101 to the metal precursor may include stopping the flow of the metal precursor into the ALD chamber. The pulse of the metal precursor may have a pulse duration sufficient for the metal precursor to react with at least 90%, at least 95%, at least 98%, at least 99%, or at least 99.9% of the reactive calcium fluoride sites at the surfaces of the optical component. In embodiments, the pulse of the metal precursor may have a pulse duration of from 10 milliseconds (ms) to 10 seconds (s), or for about 1 second. Factors influencing the pulse duration include the vapor pressure of the precursor, flow rate of the precursor, reactivity of the precursor with the surface, volume of the ALD chamber, and dimensions of the optical component. It is preferable to set the pulse duration to achieve coverage, preferably conformal coverage, of at least 90%, or at least 95%, or at least 98%, or at least 99%, or at least 99.9% of the area of the surface with the precursor or reaction product thereof. The ALD chamber then may be purged with an inert gas to remove any residual metal precursor from the ALD chamber before continuing with the ALD process.

After purging the chamber, the optical component 101 may be exposed to the pulse comprising the fluorine source. During the fluorine source pulse, the fluorine source may be injected into the chamber containing the optical component 101. The fluorine source pulse may include the fluorine source or the fluorine source in combination with an inert gas, such as any of the inert gases discussed herein. Exposing the surfaces of the optical component 101 to the subsequent pulse containing the fluorine source may cause the fluorine source to react with the ligated metal attached to the surface to reduce the ligated metal to form the metal fluoride (e.g., undergo a chemical reduction reaction between the fluorine source and ligated metal to replace the ligand with fluorine to produce the metal fluoride of the ALD coating). Injection of the fluorine source may be ceased at the end of the pulse, when at least 90%, at least 95%, at least 98%, at least 99%, or even at least 99.9% of the ligated metal at the surface of the optical component 101 has reacted with the fluorine source to form the metal fluoride. In embodiments, the fluorine source pulse may have a pulse duration of from 10 ms to 30 s, such as from 10 ms to 20 s, from 10 ms to 10 s, from 1 s to 30 s, from 1 s to 20 s, from 1 s to 10 s, from 3 s to 30 s, from 3 s to 20 s, or from 3 s to 10 s. The fluorine source pulse may be ceased by stopping the flow of the fluorine source into the ALD chamber. The ALD process may be repeated a plurality of times through a sequence of alternating pulses of metal precursor and fluorine source to add further layers of the metal fluoride to increase the thickness of the ALD coating 120.

In embodiments, the ALD coating 120 may be the $MgF_2$ ALD coating. In the case of an $MgF_2$ ALD coating, the metal precursor may be a metal ligand complex comprising magnesium as the metal. In embodiments, the metal precursor may be selected from the group consisting of bis(ethylcyclopentadienyl)magnesium, bis(cyclopentadienyl)magnesium(II), bis(2,2,6,6-tetramethyl-3,5-heptanedionato)magnesium, bis(N,N'-di-sec-butylacetamidinato)magnesium, bis(pentamethylcyclopentadienyl)magnesium, and combinations of these. Other magnesium-containing compounds may also be suitable as the metal precursor for forming the $MgF_2$ ALD coating. The metal precursor may be in vapor, plasma, liquid, or atomized liquid form.

In embodiments, the ALD coating may be a metal fluoride having a metal other than magnesium. In these cases, similar metal ligand complexes may be used where the metal is different from magnesium. For instance, in embodiments, the metal of the metal precursor may be calcium (Ca), lithium (Li), aluminum (Al), or combinations of these. In embodiments, the ALD coating may be a $CaF_2$ ALD coating. When the ALD coating is a $CaF_2$ ALD coating, the metal precursor may be selected from the group consisting of Ca(2,2,6,6-tetramethyl-3,5-heptanedionato)2, Bis(N,N'-di-isopropylformamidinato)calcium(II), bis(N,N'-diisopropylacetamidinato)calcium(II), [$Ca_3$(2,2,6,6-tetramethyl-3,5-heptanedionate)$_6$], Ca(1,2,4-triisopropylcyclopentadienyl)$_2$], and combinations thereof. In embodiments, the ALD coating may be an LiF ALD coating. When the ALD coating is an LiF ALD coating, the metal precursor may be selected from the group consisting of lithium tert-butoxide, lithium 2,2,6,6-tetramethyl-3,5-heptanedionate, and combinations of these. In embodiments, the ALD coating may be an $AlF_3$ ALD coating. $AlF_3$ ALD coatings may be amorphous instead of polycrystalline. When the ALD coating 120 is an $AlF_3$ ALD coating, the metal precursor may be selected from the group consisting of trimethylaluminum (TMA), triethylaluminum (TEA), and combinations of these. Other aluminum compounds may also be suitable for use as the metal precursor. The metal precursor pulse may include the metal precursor or a mixture of the metal precursor and an inert gas, which may be any of the inert gases previously discussed herein.

In embodiments, the ALD coating 120 may be an alloy comprising a plurality of different metals. In embodiments, the ALD coating 120 may have the general formula $A_xM_yF_z$; where A is a first metal selected from the group consisting of Mg, Ca, Li, and Al; M is a second metal different from the first metal A, where M is selected from the group consisting of Mg, Ca, Li, and Al; X is the number of moles of the first metal A; Y is the number of moles of the second metal M; and Y is the number of moles of fluorine (F). In embodiments, the ALD coating 120 may be $Li_xAl_yF_z$ or $Ca_xAl_yF_z$, in which X is the number of moles of Li or Ca, respectively; Y is the number of moles of Al, and Z is the number of moles of F. Other metal fluorides comprising a mixture of different metals are contemplated. Metal fluoride ALD coatings comprising a plurality of different metals may be made by exposing the optical component to a metal precursor pulse having a plurality of different metal precursors, each of the different metal precursors having a different metal.

The fluorine source may be derived from a fluorine-containing precursor that is selected from the group consisting of sulfur hexafluoride ($SF_6$), nitrogen trifluoride ($NF_3$), trifluoroiodomethane ($CF_3I$), hydrogen fluoride (HF), and combinations of these. In embodiments, the ALD process may be a plasma-assisted ALD process in which the fluorine source may be a plasma fluorine source derived from a fluorine-containing precursor or a fluorine-containing precursor and argon (Ar) plasma. In embodiments, the fluorine source may be a plasma comprising $SF_6$, $SF_6$ and Ar ($SF_6$/Ar), or $NF_3$ and Ar ($NF_3$/Ar). In embodiments, the fluorine source may be derived from one or more organic fluorine sources, such as but not limited to hexafluoroacetylacetone or other fluorine-containing organic compounds. However, organic fluorine sources may require additional pulse steps in the ALD process, such as a long ozone pulse, to eliminate carbon compounds from the ALD coating contributed by the organic fluorine source.

HF is commonly used as a fluorine source in ALD coating operations. However, HF is dangerous to handle and highly corrosive, particularly when contacted with water. Therefore, safer alternatives to HF are desired. $SF_6$ fluorine precursor is significantly safer to use compared to HF and is more productive than organic fluorine sources, which require a four-step process and a long ozone pulse to form the metal fluoride ALD coating. In embodiments, the fluorine source may comprise $SF_6$ or a plasma derived from $SF_6$ (i.e., $SF_6$-based plasma). In embodiments, the fluorine source may comprise, consist of or consist essentially of an $SF_6$-based fluorine source, such as $SF_6$ or an $SF_6$-based plasma. In embodiments, the fluorine source may comprise, consist of, or consist essentially of a plasma derived from $SF_6$ and Ar (i.e., $SF_6$/Ar plasma) or $SF_6$ and other inert gas. When the fluorine source comprises an $SF_6$/Ar plasma, a flow rate ratio of the Ar to $SF_6$ may be from 0.1:1 to 10:1, from 0.1:1 to 5:1, from 0.1:1 to 2:1, from 0.5:1 to 10:1, from 0.5:1 to 5:1, from 0.5:1 to 2:1, from 1:1 to 10:1, from 1:1 to 5:1, from 1:1 to 2:1, from 2:1 to 10:1, from 2:1 to 5:1, or about 2:1, where flow rate is a volumetric flow rate expressed in units of sccm (standard cubic centimeters per minute).

As previously discussed, the ALD process can be a direct reduction process in which deposition of the ALD coating is accomplished by bonding the ligated metal or ligated metalloid to the surface of the optical component and then directly reducing the ligated metal or ligated metalloid with the fluorine source to produce the metal (or metalloid) fluoride ALD coating. However, when $SF_6$, $SF_6$ plasma, or $SF_6$/Ar plasma is used as the fluorine source, the resulting ALD coating can have a high concentration of carbon impurities originating from the ligands of the ligated metal. Not intending to be bound by any particular theory, it is believed that the sulphur from the $SF_6$ may react with the ligands to damage or break apart the ligands during the reaction of the ligated metal with the fluorine source to produce the metal fluoride, thus, causing carbon or carbon-containing fragments of the ligands containing to remain in the ALD coating.

The concentration of carbon deposits in the metal fluoride ALD coating can be reduced or eliminated by conducting an oxide formation step between the metal precursor pulse and the fluorine source pulse. The oxide formation step may comprise exposing the optical component having the layer of ligated metal deposited on the surfaces thereof to an oxygen source for a pulse duration sufficient to oxidize or convert the ligated metal to a metal oxide. Exposure of the ligated metal to the pulse containing the oxygen source may cause the ligand of the ligated metal to react with oxygen of the oxygen source to replace the ligand with oxygen, which becomes bonded to the metal or metalloid (e.g., the ligated metal undergoes an oxidation reaction to convert the ligated metal layer into a metal oxide layer). Following the oxide formation, the ALD chamber may be purged of any residual oxygen source, and the optical component with the layer of metal oxide on the surfaces may then be exposed to the pulse containing the fluorine source. Exposure of the metal oxide to the fluorine source may convert the metal oxide into the metal fluoride ALD coating. The oxygen source may be water ($H_2O$), $H_2O$ plasma, ozone ($O_3$), $O_3$ plasma, oxygen ($O_2$), $O_2$ plasma, hydrogen peroxide, other oxygen-containing gases, other oxygen-containing liquids, or combinations of these. The oxygen source may be in a liquid state, gaseous state, or plasma state. In embodiments, the oxygen source pulse may include the oxygen source or the oxygen source in combination with one or more inert gases, which may be any of the inert gases previously described herein.

When an $SF_6$-based fluorine source is used, the metal fluoride ALD coating prepared by first converting the metal ligand to the metal oxide with the oxygen source pulse and then converting the metal oxide to metal fluoride with the fluorine source pulse may produce a metal fluoride ALD coating having a lesser concentration of carbon compared to direct reduction of the metal ligand with the fluorine source. Not to be bound by any particular theory, it is believed that oxidation of the ligands of the ligated metal may wholly remove the ligands from the metal without decomposing the ligand, thereby eliminating or greatly reducing the fragments of organic (carbon-containing) constituents that remain attached to the metal or that otherwise remain present in the ALD coating. The oxygen content of the metal fluoride ALD coating prepared by oxidation of the metal ligand with the oxygen source pulse followed by reduction of the metal oxide with fluorine source pulse may be greater than the metal fluoride ALD coating produced by directly reducing the metal ligand with the fluorine source pulse. However, the concentrations of oxygen in the metal fluoride ALD coating prepared by formation of the oxide intermediate have been found to be comparable to the oxygen concentration in existing PVD metal fluoride coatings.

In embodiments, the ALD coating 120 may be a metal fluoride coating, and the ALD process may include exposing the surfaces of the optical component 101 to the pulse containing the metal precursor followed by a pulse containing an oxygen source, which is then followed by a pulse containing the fluorine source. The ALD process may first comprise exposing the optical component to the metal precursor. During the pulse of the metal precursor, the metal precursor, in vapour, plasma, or atomized liquid form, may be introduced, such as through injection, into the ALD chamber containing the optical component 101. Exposing the surfaces of the optical component to the pulse containing the metal precursor may cause the metal precursor to react with the $CaF_2$ at the surfaces of the optical component 101 to bond a single layer (monolayer) of ligated metal on the surfaces of the optical component 101. The metal precursor may be any of the metal precursors previously described herein. The metal precursor pulse may have a duration sufficient to cause the metal precursor to react with at least 90%, at least 95%, at least 98%, at least 99%, or even at least 99.9% of the reactive calcium fluoride sites at the surface of the optical component. The metal precursor pulse may have a pulse duration of from 10 ms to 10 s, or about 1 second. The single layer of ligated metal bonded to the surface may have a thickness equivalent to a size of a single molecule of the metal ligand. For pulses of the metal precursor subsequent to the initial coating layer, the metal precursor may react with the previously deposited metal fluoride ALD coating to bond a subsequent single layer of ligated metal to the outer surface of the metal fluoride ALD coating. After depositing and bonding the single layer of ligated metal to the outer surface of the optical component 101, the ALD coating process may further include ceasing exposure of the optical component 101 to the metal precursor. Ceasing exposure of the optical component 101 to the metal precursor may include stopping the flow of the metal precursor into the ALD chamber. The ALD chamber may then be purged with an inert gas to remove any residual metal precursor from the chamber before continuing with the ALD process.

After ceasing exposure of the optical component to the metal precursor and purging the ALD chamber, the ALD process may include exposing the optical component with the layer of ligated metal bonded thereto to an oxygen source. The oxygen source may include water, water plasma, oxygen, oxygen plasma, ozone, ozone plasma, hydrogen peroxide, hydrogen peroxide plasma, oxygen-containing liquid, oxygen-containing gas, or combinations of these. The oxygen source may be in a liquid state, gaseous state, or plasma state. Exposing the optical component to the oxygen source may comprise introducing a pulse containing the oxygen source into the ALD chamber containing the optical component. In embodiments, the oxygen source pulse may include the oxygen source or the oxygen source in combination with one or more inert gases, which may be any of the inert gases previously described herein. Exposing the optical component to the oxygen-containing pulse may cause oxidation of the ligated metal to form the metal oxide on the surfaces of the optical component. The oxygen source pulse may have a pulse duration sufficient to cause the oxygen source to react with at least 90%, at least 95%, at least 98%, at least 99%, or even at least 99.9% of the ligated metal bonded to the surfaces of the optical component (or surface of the ALD coating for application of subsequent coating layers). The oxygen source pulse may have a pulse duration of from 0.1 seconds to 1 second, or about 0.3 seconds. The ALD process may further include ceasing exposure of the optical component to the oxygen source pulse, such as by stopping the flow of the oxygen source into the ALD chamber at the end of the oxygen source pulse. In embodiments, the ALD chamber may then be purged with an inert gas after the oxygen source pulse, which may remove any residual oxygen and organic compounds from the ALD chamber.

The ALD process may further include, after the oxygen source pulse, exposing the optical component having the layer of metal oxide deposited on surfaces thereof to the fluorine source. Exposing the optical component to the fluorine source may comprise introducing a pulse containing the fluorine source to the ALD chamber containing the optical component. The fluorine source may be any of the compositions previously described herein for the fluorine source. In embodiments, the fluorine source is an $SF_6$-based fluorine source, such as but not limited to $SF_6$, $SF_6$ plasma, $SF_6$/Ar plasma, or combinations of these. The fluorine from the fluorine source may reduce the metal oxides to form the metal fluoride ALD coating on the surfaces of the optical component. The fluorine source pulse may have a duration sufficient to cause the fluorine to react with at least 90%, at least 95%, at least 98%, at least 99%, or even at least 99.9% of the metal oxide at the surfaces of the optical component (or surface of the ALD coating for application of subsequent coating layers). The fluorine source pulse may have a pulse duration of from 10 ms to 30 s, such as from 10 ms to 20 s, from 10 ms to 10 s, from 1 s to 30 s, from 1 s to 20 s, from 1 s to 10 s, from 3 s to 30 s, from 3 s to 20 s, or from 3 s to 10 s. The process may further include ceasing exposure of the optical component to the fluorine source, such as by stopping the flow of the fluorine source into the ALD chamber at the end of the fluorine source pulse. As previously discussed, exposing the optical component to the oxygen source after exposure to the metal precursor and before exposure to the fluorine source may reduce the concentration of carbon in the ALD coating applied to the optical component compared to alternating pulses of the metal precursor and the fluorine source without the pulse containing the oxygen source.

The optical component may be contacted with/exposed to the metal precursor and fluorine source or metal precursor, oxygen source, and fluorine source at operating conditions sufficient to cause the metal precursor, fluorine source, oxygen source, or combinations of these to undergo chemical reactions at the surfaces of the optical component. The ALD process may be conducted at a process temperature sufficient to cause the metal precursor, oxygen source, fluorine source, or combinations of these to undergo reactions at the surface of the optical component. In embodiments, the ALD process can be a plasma-assisted ALD process, in which plasma materials are utilized for one or more of the metal precursor pulse, oxygen source pulse, fluorine source pulse, or combinations of these, and the ALD process can be conducted at a process temperature sufficient to generate and maintain the materials in the plasma state during the pulses. In embodiments, the ALD process may include depositing the ALD coating on the surfaces of the optical component at a process temperature of from 120° C. to 250° C. The optical component may be exposed to/contacted with the metal precursor, oxygen source, fluorine source, or combinations of these at the process temperature of from 120° C. to 250° C.

In embodiments, the ALD process can be a plasma-assisted ALD process, in which plasma materials are utilized for one or more of the metal precursor pulse, oxygen source pulse, fluorine source pulse, or combinations of these. The metal precursor, oxygen source, fluorine source, or combinations of these may be converted into a plasma by heating the materials and subjecting the materials to an electric current or a strong electromagnetic field. The materials (e.g., metal precursor, oxygen source, fluorine source, or combinations of these) may be heated to the ALD process temperature and subjected to an electric current sufficient to convert the materials into a plasma. In embodiments, converting the materials (e.g., metal precursor, oxygen source, fluorine source, or combinations of these) into a plasma may comprise heating the materials to a temperature of from 120° C. to 250° C. and applying an electric current having a power of from 100 Watts (W) to 300 W, or about 200 W.

The ALD process may be repeated a plurality of times to build up the thickness of the ALD coating. Each iteration of the ALD process may add another molecular layer of the ALD coating material to the ALD coating. The thickness of the ALD coating may be controlled by controlling the number of iterations of the ALD process, thus, controlling the number of molecular layers of ALD coating material in the ALD coating.

In embodiments, the ALD coating 120 may be a metal fluoride ALD coating comprising a stack of different layers, wherein each of the different layers comprises a metal fluoride having a different metal from the metal fluorides in adjacent layers in the stack. In embodiments, the ALD coating 120 may comprise a stack of metal fluorides comprising an amorphous $AlF_3$ ALD coating disposed between layers of polycrystalline metal fluoride ALD coatings, such as but not limited to $CaF_2$, $MgF_2$, or $LiF_2$ ALD coatings. Other combinations of different metal fluoride layers formed nto a stack are also contemplated.

The ALD process for forming the ALD coating on the optical component may further include cleaning the surfaces of the optical component before depositing the ALD coating thereon. In embodiments, the ALD process does not require or include rotating the optical component during the coating process. In embodiments, the ALD process does not require or include holding the optical component in a fixture, where the fixture masks at least a portion of the surfaces of the optical component. In embodiments, one or more, or two or more, or three or more, or up to and including all surfaces of the optical component are coated with the ALD coating simultaneously in the ALD process.

Figure 1C:
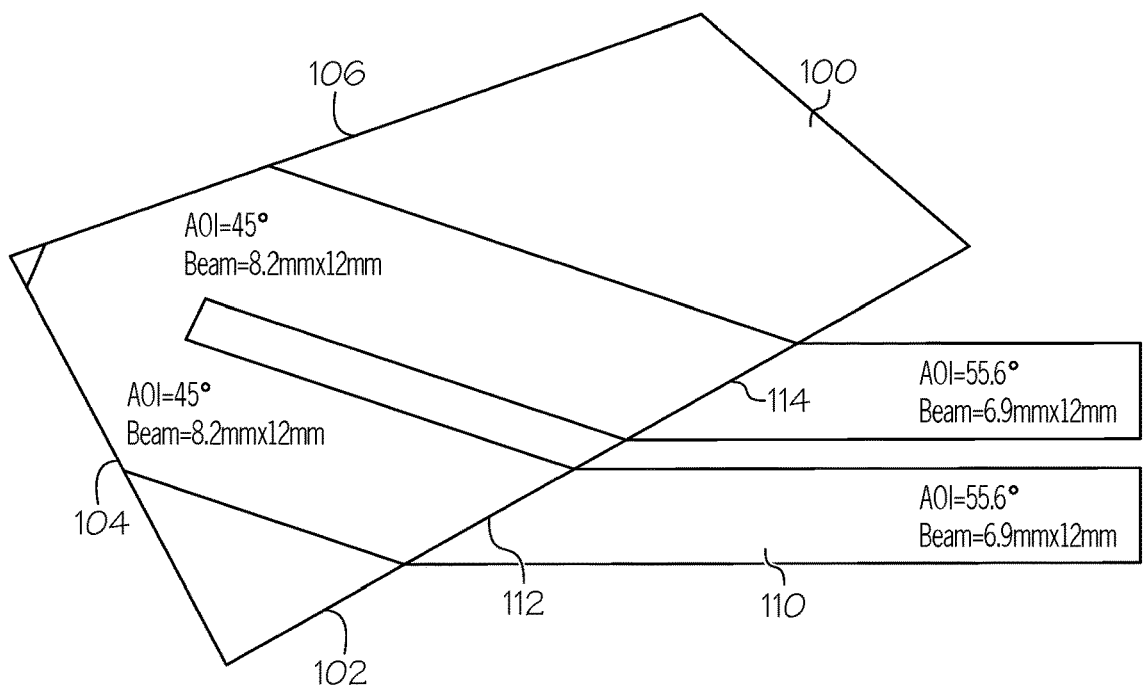
FIG. 1C schematically depicts a top view of the prism of FIG. 1A, according to one or more embodiments shown and described herein.
Figure 1D:
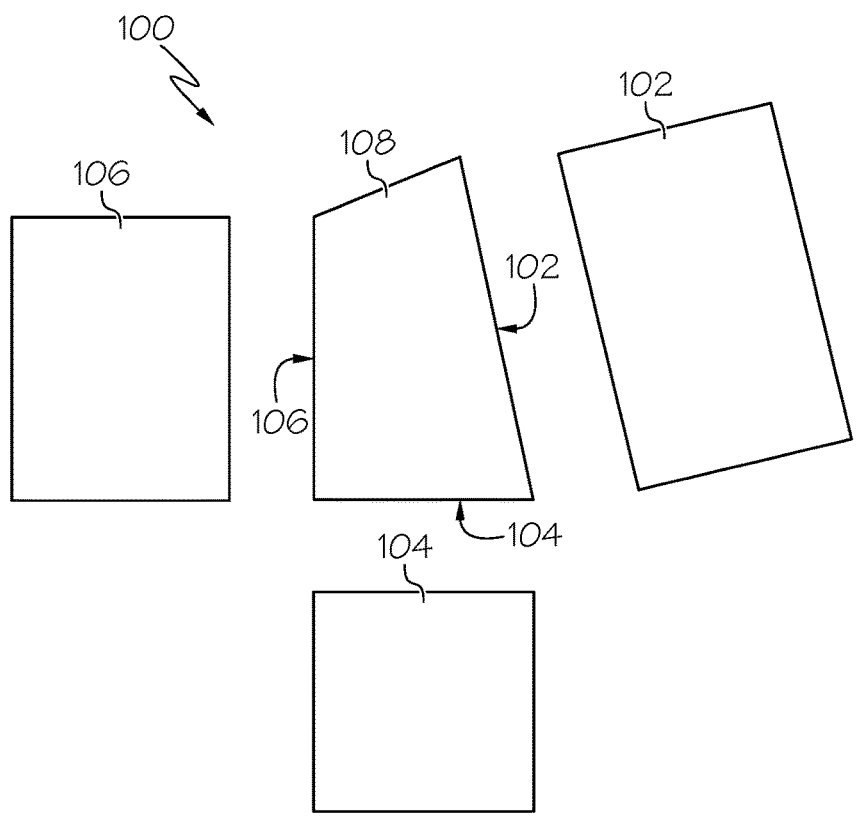
FIG. 1D schematically depicts surfaces of the prism of FIG. 1A, according to one or more embodiments shown and described herein.
Figure 2A:
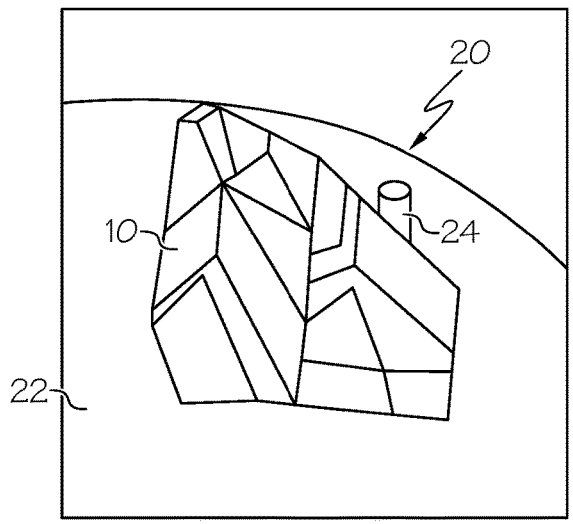
FIGS. 2A-2D schematically depict various fixtures for holding and rotating optical components during physical vapor deposition (PVD) coating, according to the prior art.
Figure 2B:
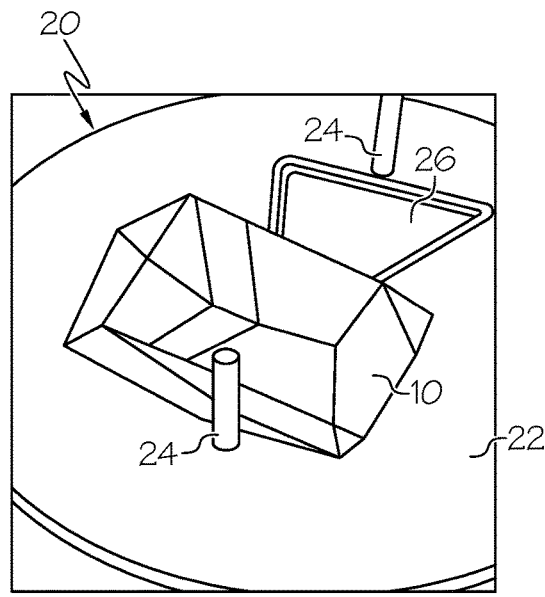
Figure 2C:
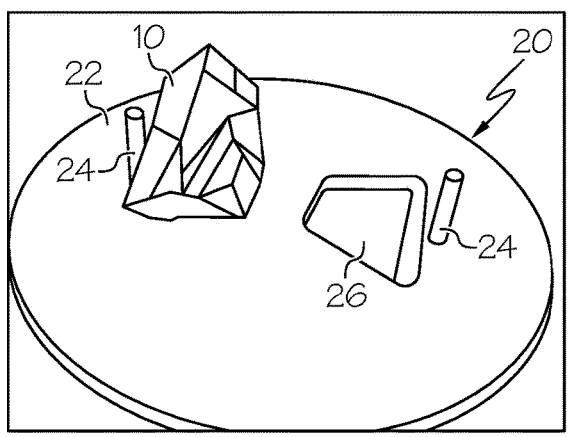
Figure 2D:
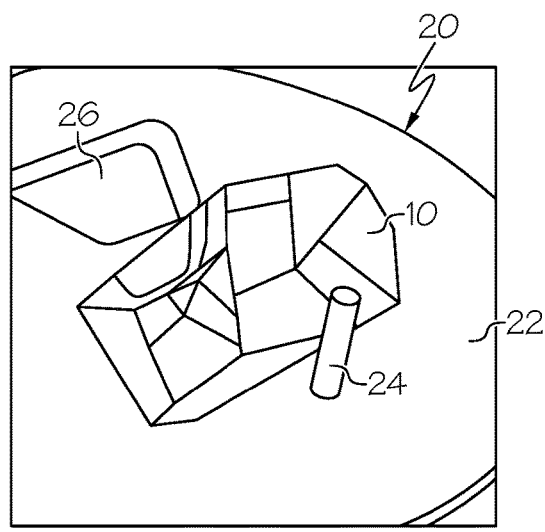

Referring again to FIG. 1B, the ALD coating 120 may be bonded to the surfaces (e.g., optical surfaces 102, 104, and 106 of coated optical component 101 in FIGS. 1A-1D or other surfaces) of the optical component 101, such as being bonded to the $CaF_2$ at the surfaces of the optical component 101. The ALD coating 120 may include a metal fluoride, such as but not limited to magnesium fluoride. In embodiments, the ALD coating may comprise a metal fluoride ALD coating or a metal fluoride ALD coating layer that includes greater than or equal to 90%, greater than or equal to 95%, greater than or equal to 98%, greater than or equal to 99%, or greater than or equal to 99.9% by weight metal fluoride based on the total weight of the ALD coating or metal fluoride ALD coating layer, respectively.

In embodiments, the ALD coating or ALD coating layer may be a metal fluoride ALD coating and may include sulfur in addition to the metal fluoride. In embodiments, the ALD coating or an ALD coating layer may comprise a metal fluoride ALD coating and may have a sulfur content in the metal fluoride ALD coating of greater than zero parts per million (ppm), such as from greater than zero ppm to 300 ppm, or from greater than 1 ppm to 250 ppm, or from greater than 5 ppm to 200 ppm, or from greater than 10 ppm to 150 ppm, or from greater than 25 ppm to 125 ppm.

In embodiments, the ALD coating or ALD coating layer may comprise the metal fluoride ALD coating and the metal fluoride ALD coating may be substantially free of carbon. In embodiments, the metal fluoride ALD coating may have a concentration of carbon of less than or equal to 10,000 ppm, or less than or equal to 5,000 ppm, or less than or equal to 1,000 ppm, or less than 500 ppm in the metal fluoride ALD coating.

The ALD coating 120 may have a thickness sufficient to cover the surfaces of the optical component 101 without substantial exposure of the surface of the optical component to the atmosphere within the coated area. In embodiments, the ALD coating may comprise a metal fluoride ALD coating or a metal fluoride ALD coating layer having a thickness of less than or equal to 10 nanometers (nm), such as less than or equal to 8 nm, or even less than or equal to 5 nm. In embodiments, the ALD coating may comprise a metal fluoride ALD coating or a metal fluoride ALD coating layer having a thickness of greater than or equal to 0.25 nm, greater than or equal to 0.50 nm, or even greater than or equal to 1.0 nm. In embodiments, the ALD coating may comprise a metal fluoride ALD coating or a metal fluoride ALD coating layer having a thickness of from 0.25 nm to 10 nm, from 0.25 nm to 8 nm, from 0.25 nm to 5 nm, 0.35 nm to 10 nm, from 0.35 nm to 8 nm, from 0.35 nm to 5 nm, from 0.5 nm to 10 nm, from 0.5 nm to 8 nm, from 0.5 nm to 5 nm, from 1 nm to 10 nm, from 1 nm to 8 nm, from 1 nm to 5 nm, from 0.25 nm to 1 nm, or from 5 nm to 10 nm. In embodiments, the ALD coating may include multiple ALD coating layers, where each of the multiple ALD coating layers comprises a different coating material. In these embodiments, each of the multiple ALD coating layers may have a thickness of from 0.25 nm to 10 nm, from 0.25 nm to 8 nm, from 0.25 nm to 5 nm, 0.35 nm to 10 nm, from 0.35 nm to 8 nm, from 0.35 nm to 5 nm, from 0.5 nm to 10 nm, from 0.5 nm to 8 nm, from 0.5 nm to 5 nm, from 1 nm to 10 nm, from 1 nm to 8 nm, from 1 nm to 5 nm, from 0.25 nm to 1 nm, or from 5 nm to 10 nm. The total thickness of the ALD coating may be the sum of the thicknesses of the individual ALD coating layers.

The ALD coating 120 may be a conformal coating having a uniform thickness across all coated surfaces. In embodiments, the ALD coating 120 may have a thickness that varies by less than or equal to 5%, less than or equal to 4%, less than or equal to 3%, less than or equal to 2%, less than or equal to 1%, or even less than or equal to 0.5% from an average thickness of the ALD coating 120. The average thickness of the ALD coating is the thickness of the ALD coating averaged over all of the surface area of the surfaces in contact with the ALD coating 120.

As previously discussed, the ALD coating process does not require holding the optical component in a fixture and rotating the optical component during the coating process. Therefore, the ALD coating process may result in deposition of the ALD coating evenly over one, a plurality, or all of the surfaces of the optical component. In embodiments, the coated optical component may include the ALD coating deposited on and/or contacting at least 95%, at least 98%, at least 99%, or even at least 99.5% of the optical surfaces of the optical component 101 intended to be coated (e.g., surfaces 102, 104, and 106 of coated optical component 101 in FIGS. 1A-1D; surfaces 202, 204, 206, and 208 of the coated optical component 200 in FIGS. 3A-3C; surfaces 402, 404, and 406 of the coated optical component 400 in FIG. 4; surface 504 of the high NA objective lens 502 in FIG. 5; or other optical surfaces). Surfaces of the optical component 101 that are intended to be coated are surfaces that are not intentionally masked to prevent ALD coating. The ALD coating may also be deposited on and/or may be in contact with other non-optical surfaces of the optical components, such as surfaces on which the laser beam or light beam is not expected to be incident. In embodiments, the coated optical component 100 does not include optical surfaces having greater than 10%, greater than 5%, or even greater than 1% of the surface area of the optical surfaces that is uncoated.

In embodiments, the coated optical component (e.g., coated optical components 100, 200, 400; high NA objective lens 500, or other optical component) may have an ALD coating or ALD coating layer comprising a metal oxide ALD coating and/or a metalloid oxide ALD coating. In embodiments, the ALD coating 120 may be a metal oxide coating, such as but not limited to an alumina ($Al_2O_3$) ALD coating, a hafnium oxide ($HfO_2$) ALD coating, a lanthanum oxide ($La_2O_3$) ALD coating, or a gadolinium oxide ($Gd_2O_3$) ALD coating. When the ALD coating is a metal oxide ALD coating, the ALD process for depositing the metal oxide ALD coating onto the surfaces of the optical component may include exposing the surfaces of the optical component to alternating pulses of a metal precursor and an oxygen source. The metal precursor may be a metal bonded to one or more organic groups. In embodiments, the metal oxide ALD coating may be an alumina ALD coating. For an alumina ALD coating, the metal precursor for the metal precursor pulse may be an aluminum precursor selected from the group consisting of trimethylaluminum (TMA), triethylaluminum (TEA), and combinations of these. Other aluminum compounds may also be suitable for use as the metal precursor. The metal precursor may be in vapor, plasma, liquid, or atomized liquid form. In embodiments, the metal precursor pulse may include the metal precursor in combination with one or more inert gases, which may be any of the inert gases previously described herein.

The oxygen source for preparing a metal oxide ALD coating may be the same as the oxygen sources previously described herein in the context of preparing a metal fluoride coating using $SF_6$-based fluorine sources. In particular, the oxygen source may be water ($H_2O$), $H_2O$ plasma, ozone ($O_3$), $O_3$ plasma, oxygen ($O_2$), $O_2$ plasma, hydrogen peroxide ($H_2O_2$), hydrogen peroxide plasma, other oxygen-containing gases, other oxygen-containing liquids, or combinations of these. The oxygen source may be selected from the group consisting of water ($H_2O$), $H_2O$ plasma, ozone ($O_3$), $O_3$ plasma, oxygen ($O_2$), $O_2$ plasma, hydrogen peroxide, hydrogen peroxide plasma, other oxygen-containing gases, other oxygen-containing liquids, and combinations of these. The oxygen source may be in a liquid state, gaseous state, or plasma state. In embodiments, the oxygen source pulse may include the oxygen source or the oxygen source in combination with one or more inert gases, which may be any of the inert gases previously described herein. Exposure of the metal precursor bonded to the surfaces of the optical component to the pulse containing the oxygen source may cause the metal precursor to react with the oxygen of the oxygen source to replace the organic constituents of the metal precursor with oxygen, which becomes bonded to the metal or metalloid (e.g., the ligated metal undergoes an oxidation reaction to oxidize or convert the metal precursor into a metal oxide layer).

The ALD process for preparing a metal oxide ALD coating or coating layer may first comprise exposing the optical component to the metal precursor. During the pulse of the metal precursor, the metal precursor, in vapor, plasma, or atomized liquid form, may be introduced, such as through injection, into the ALD chamber containing the optical component 101. Exposing the surfaces of the optical component to the pulse containing the metal precursor may cause the metal precursor to react with constituents at the surfaces of the optical component 101 to bond a single layer of metal precursor (or reaction product thereof) onto the surfaces of the optical component 101. The constituents at the surface of the optical component 101 may include calcium fluoride, metal oxide previously deposited onto the optical component 101, metal fluoride previously deposited onto the optical component, or metalloid oxide previously deposited onto the surfaces of the optical component. The metal precursor may be any of the metal precursors previously described herein. The metal precursor pulse may have a duration sufficient to cause the metal precursor to react with at least 90%, at least 95%, at least 98%, at least 99%, or even at least 99.9% of the reactive sites at the surface of the optical component. The metal precursor pulse may have a pulse duration of from 10 ms to 10 s, or about 1 second. The single layer of metal precursor bonded to the surface may have a thickness approximately equal to a size of one molecule of the metal precursor. For pulses of the metal precursor subsequent to the initial coating layer, the metal precursor may react with the previously deposited metal oxide ALD coating to bond a subsequent single layer of metal precursor to the outer surfaces of the metal oxide ALD coating. After depositing and bonding the single layer of metal precursor onto the outer surface of the optical component 101, the ALD coating process may further include ceasing exposure of the optical component 101 to the metal precursor. Ceasing exposure of the optical component 101 to the metal precursor may include stopping the flow of the metal precursor into the ALD chamber. The ALD chamber may then be purged with an inert gas to remove any residual metal precursor from the chamber before continuing with the ALD process.

After ceasing exposure of the optical component to the metal precursor and purging the ALD chamber, the ALD process for preparing a metal oxide ALD coating may include exposing the optical component with the layer of metal precursor bonded thereto to the oxygen source. Exposing the optical component to the oxygen source may comprise introducing a pulse containing the oxygen source into the ALD chamber containing the optical component. Exposing the optical component to the oxygen-containing pulse may cause oxidation of the metal precursor to form the metal oxide on the surfaces of the optical component. The oxygen source pulse may have a pulse duration sufficient to cause the oxygen source to react with at least 90%, at least 95%, at least 98%, at least 99%, or even at least 99.9% of the metal precursor bonded to the surfaces of the optical component (or surface of the ALD coating for application of subsequent coating layers). The oxygen source pulse may have a pulse duration of from 0.1 seconds to 1 second, or about 0.3 seconds. The ALD process may further include ceasing exposure of the optical component to the oxygen source pulse, such as by stopping the flow of the oxygen source into the ALD chamber at the end of the pulse. In embodiments, the ALD chamber may then be purged with an inert gas after the oxygen source pulse, which may remove any residual oxygen and organic compounds or fragments from the ALD chamber. The ALD process for depositing the metal oxide ALD coating onto the optical component may be conducted at the same operating conditions previously described in the context of depositing the metal fluoride ALD coating. The ALD process for depositing the metal oxide ALD coating may be repeated a plurality of times to increase the thickness of the metal oxide ALD coating.

In embodiments, the ALD coating may include primarily a metal oxide, such as but not limited to alumina. In embodiments, the ALD coating may comprise a metal oxide ALD coating or a metal oxide ALD coating layer that includes greater than or equal to 90%, greater than or equal to 95%, greater than or equal to 98%, greater than or equal to 99%, or greater than or equal to 99.9% by weight metal oxide based on the total weight of the metal oxide ALD coating layer, respectively.

In embodiments, the ALD coating 120 may be a metalloid oxide coating, such as but not limited to a silica ($SiO_2$) ALD coating. When the ALD coating is a metalloid oxide ALD coating, the ALD process for depositing the metal oxide ALD coating onto the surfaces of the optical component may include exposing the surfaces of the optical component to alternating pulses of a metalloid precursor and an oxygen source. The metal precursor may be a metalloid, such as but not limited to silicon (Si), boron (B), germanium (Ge), etc., bonded to one or more organic groups. In embodiments, the metalloid oxide ALD coating may be a silica ALD coating. For silica ALD coatings, the metalloid precursor may be silica precursor selected from the group consisting of consisting of bis(tert-butylamino)silane (i.e., $SiH_2(NHtBu)_2$, BTBAS); di(sec-butylamino)silane (i.e., $SiH_3(NsecBu_2)$, DSBAS); diisopropylaminotrisilylamine; a compound having chemical formula $SiH_2(NRR')_2$, where R and R' are each independently a methyl group, an ethyl group, or both; and combinations of these. Other silica compounds may also be suitable for use as the metalloid precursor. The metalloid precursor may be in vapor, plasma, liquid, or atomized liquid form. In embodiments, the pulse of the metalloid precursor may include the metalloid precursor in combination with one or more inert gases, which may be any of the inert gases previously described herein.

The oxygen source for preparing a metalloid oxide ALD coating may be the same as the oxygen sources previously described herein. In particular, the oxygen source may be water ($H_2O$), $H_2O$ plasma, ozone ($O_3$), $O_3$ plasma, oxygen ($O_2$), $O_2$ plasma, hydrogen peroxide, hydrogen peroxide plasma, other oxygen-containing gases, other oxygen-containing liquids, or combinations of these. The oxygen source may be in a liquid state, gaseous state, or plasma state. In embodiments, the oxygen source pulse may include the oxygen source or the oxygen source in combination with one or more inert gases, which may be any of the inert gases previously described herein. Exposure of the metalloid precursor bonded to the surfaces of the optical component to the pulse containing the oxygen source may cause the metalloid precursor to react with the oxygen of the oxygen source to replace the organic constituents of the metalloid precursor with oxygen, which is bonded to the metalloid (e.g., the metalloid precursor undergoes an oxidation reaction to convert the metalloid precursor into a metalloid oxide layer).

The ALD process for preparing a metalloid oxide ALD coating or coating layer may first comprise exposing the optical component to the metalloid precursor. During the pulse of the metalloid precursor, the metalloid precursor, in vapor, plasma, liquid, or atomized liquid form, may be introduced, such as through injection, into the ALD chamber containing the optical component 101. Exposing the surfaces of the optical component to the pulse containing the metalloid precursor may cause the metalloid precursor to react with constituents at the surfaces of the optical component 101 to bond a single layer of metalloid precursor onto the surfaces of the optical component 101. The constituents at the surface of the optical component 101 may include calcium fluoride, metal oxide previously deposited onto the optical component 101, metal fluoride previously deposited onto the optical component, or metalloid oxide previously deposited onto the surfaces of the optical component. The metalloid precursor may be any of the metalloid precursors previously described herein. The metalloid precursor pulse may have a duration sufficient to cause the metalloid precursor to react with at least 90%, at least 95%, at least 98%, at least 99%, or even at least 99.9% of the reactive sites at the surface of the optical component. The metalloid precursor pulse may have a pulse duration of from 10 ms to 10 s, or about 1 second. The single layer of metalloid precursor bonded to the surface may have a thickness approximately equal to a size of one molecule of the metalloid precursor. For pulses of the metalloid precursor subsequent to the initial coating layer, the metalloid precursor may react with the previously deposited metalloid oxide ALD coating to bond a subsequent single layer of metalloid precursor to the outer surfaces of the metalloid oxide ALD coating. After depositing and bonding the single layer of metalloid precursor onto the outer surface of the optical component 101, the ALD coating process may further include ceasing exposure of the optical component 101 to the metalloid precursor. Ceasing exposure of the optical component 101 to the metalloid precursor may include stopping the flow of the metalloid precursor into the ALD chamber. The ALD chamber may then be purged with an inert gas to remove any residual metalloid precursor from the chamber before continuing with the ALD process.

After ceasing exposure of the optical component to the metalloid precursor and purging the ALD chamber, the ALD process for preparing the metalloid oxide ALD coating may include exposing the optical component with the layer of metalloid precursor bonded thereto to the oxygen source. Exposing the optical component to the oxygen source may comprise introducing a pulse containing the oxygen source into the ALD chamber containing the optical component. Exposing the optical component to the oxygen-containing pulse may cause oxidation of the metalloid precursor to form the metalloid oxide, such as silica, on the surfaces of the optical component. The oxygen source pulse may have a pulse duration sufficient to cause the oxygen source to react with at least 90%, at least 95%, at least 98%, at least 99%, or even at least 99.9% of the metalloid precursor bonded to the surfaces of the optical component (or surface of the ALD coating for application of subsequent coating layers). The oxygen source pulse may have a pulse duration of from 0.1 seconds to 1 second, or about 0.3 seconds. The ALD process may further include ceasing exposure of the optical component to the oxygen source pulse, such as by stopping the flow of the oxygen source into the ALD chamber at the end of the pulse. In embodiments, the ALD chamber may then be purged with an inert gas after the oxygen source pulse, which may remove any residual oxygen and organic compounds from the ALD chamber. The ALD process for depositing the metalloid oxide ALD coating onto the optical component may be conducted at the same operating conditions previously described in the context of deposing the metal fluoride ALD coating. The ALD process for depositing the metalloid oxide ALD coating may be repeated a plurality of times to increase the thickness of the metalloid oxide ALD coating.

In embodiments, the ALD coating may include primarily a metalloid oxide, such as but not limited to a silica ALD coating. In embodiments, the ALD coating may comprise a metalloid oxide ALD coating or a metalloid oxide ALD coating layer that includes greater than or equal to 90%, greater than or equal to 95%, greater than or equal to 98%, greater than or equal to 99%, or greater than or equal to 99.9% by weight metalloid oxide based on the total weight of the metalloid oxide ALD coating layer, respectively.

The metal oxide ALD coatings and metalloid ALD coatings may have properties similar to the properties previously discussed for the metal fluoride ALD coatings. In particular, the ALD coating (e.g., metal oxide and/or metalloid oxide) may be bonded to the surfaces (e.g., surface 102 and other surfaces) of the optical component 101, such as being bonded to the $CaF_2$ at the surfaces of the optical component. In embodiments, the ALD coating or ALD coating layer comprising metal oxide and/or metalloid oxide may be substantially free of carbon. In embodiments, the metal oxide ALD coating and/or the metalloid oxide ALD coating may have a concentration of carbon of less than 10,000 ppm, or less than 5,000 ppm, or less than or equal to 1,000 ppm, or less than 500 ppm of the metal oxide ALD coating and/or metalloid oxide ALD coating, respectively.

The ALD coating or ALD coating layer comprising the metal oxide and/or metalloid oxide may have a thickness from 0.25 nm to 10 nm, from 0.25 nm to 8 nm, from 0.25 nm to 5 nm, from 0.5 nm to 10 nm, from 0.5 nm to 8 nm, from 0.5 nm to 5 nm, from 1 nm to 10 nm, from 1 nm to 8 nm, from 1 nm to 5 nm, from 0.25 nm to 1 nm, or from 5 nm to 10 nm. In embodiments, the ALD coating may include multiple ALD coating layers, where each of the multiple ALD coating layers comprise a different material. In these embodiments, each of the multiple ALD coating layers may have a thickness of from 0.25 nm to 10 nm, from 0.25 nm to 8 nm, from 0.25 nm to 5 nm, from 0.5 nm to 10 nm, from 0.5 nm to 8 nm, from 0.5 nm to 5 nm, from 1 nm to 10 nm, from 1 nm to 8 nm, from 1 nm to 5 nm, from 0.25 nm to 1 nm, or from 5 nm to 10 nm. The total thickness of the ALD coating may be the sum of the thicknesses of the individual ALD coating layers.

In embodiments, the coated optical component may include the ALD coating and/or ALD coating layer comprising the metal oxide and/or metalloid oxide deposited on and/or in contact with at least 95%, at least 98%, at least 99%, or even at least 99.5% of the optical surfaces of the optical component 101 that are intended to be coated (e.g., surfaces that are not intentionally masked, non-limiting examples of which may include one or more of surfaces 102, 104, and 106 of coated optical component 101 in FIGS. 1A-1D; surfaces 202, 204, 206, and 208 of the coated optical component 200 in FIGS. 3A-3C; surfaces 402, 404, and 406 of the coated optical component 400 in FIG. 4; surface 504 of the high NA objective lens 502 in FIG. 5; or other optical surfaces). The ALD coating may also be deposited on other non-optical surfaces of the optical components, such as surfaces on which the laser beam or light beam is not expected to be incident.

Referring again to FIG. 6, as previously discussed, the coated optical component 100 may have an ALD coating 120 that comprises a plurality of ALD coating layers (e.g., first ALD coating layer 130, second ALD coating layer 140, etc.) applied to the surfaces of the optical component 100. In embodiments, the coated optical component 100 may have the first ALD coating layer 130 directly contacting one or more of the surfaces (e.g., surfaces 102, 104, and 106 of coated optical component 101 in FIGS. 1A-1D; surfaces 202, 204, 206, and 208 of the coated optical component 200 in FIGS. 3A-3C; surfaces 402, 404, and 406 of the coated optical component 400 in FIG. 4; surface 504 of the high NA objective lens 502 in FIG. 5; or other optical surfaces) of the optical component 101 and at least one second ALD coating layer 140 applied on top of the first ALD coating layer 130. The first ALD coating layer 130 may have an inner surface 132 coupled directly to the $CaF_2$ at the surfaces (e.g., first surface 102, etc.) of the optical component 101 and an outer surface 134 facing away from the surface of the optical component 101. The second ALD coating layer 140 may be a material different from the first ALD coating layer 130. The second ALD coating layer 140 may have an inner surface 142 directly coupled to the outer surface 134 of the first ALD coating layer 130. The second ALD coating layer 140 may have an outer surface 144 facing in a direction away from the first ALD coating layer 130. The second ALD coating layer 140 may be directly coupled to the first ALD coating layer 130 such that the inner surface 142 of the second ALD coating layer 140 contacts and is bonded to the outer surface 134 of the first ALD coating layer 130 without any intervening layer or coating disposed between the first ALD coating layer 130 and the second ALD coating layer 140. One or more additional ALD coating layers may be applied on top of the second ALD coating layer 140 to provide a stack of ALD coating layers. The first ALD coating layer 130, the second ALD coating layers 140, subsequent ALD coating layers, or combinations of these, may have a thickness less than 10 nm, such as from 0.25 nm to 10 nm, as previously discussed.

Specific examples of stack.

The coated optical component 100 having an ALD coating 120 comprising a plurality of ALD coating layers may be prepared by applying the first ALD coating layer 130 to the surfaces of the optical component (e.g., surfaces 102, 104, and 106 of coated optical component 101 in FIGS. 1A-1D; surfaces 202, 204, 206, and 208 of the coated optical component 200 in FIGS. 3A-3C; surfaces 402, 404, and 406 of the coated optical component 400 in FIG. 4; surface 504 of the high NA objective lens 502 in FIG. 5; or other optical surfaces) and applying a second ALD coating layer 140 onto the first ALD coating layer 130 such that the first ALD coating layer 130 is disposed between the optical component 101 and the second ALD coating layer 140. The first ALD coating layer 130 and the second ALD coating layer 140 may be deposited onto one or more surfaces of the optical component 101 according any of the ALD processes previously discussed herein.

Referring again to FIG. 6, in embodiments, the first ALD coating layer 130 may be a metal fluoride ALD coating having a metal different from calcium, and the second ALD coating layer 140 may be a metal oxide or metalloid oxide coating. In embodiments, the first ALD coating layer 130 may be an $MgF_2$ ALD coating and the second ALD coating layer 140 may be a silica ALD coating, an alumina ALD coating, or both. In embodiments, the first ALD coating layer 130 comprising the metal fluoride ALD coating may be a cushion layer, and the second ALD coating layer 140 comprising the silica ALD coating, the alumina ALD coating, or both may be a capping layer. The $MgF_2$ ALD coating may have a thickness of from 0.25 nm to 10 nm, or from 0.25 nm to 5 nm, and the capping layer may have a thickness of from 1 nm to 10 nm. The cushion layer comprising the $MgF_2$ ALD may be disposed between the optical component 101 and the capping layer comprising the alumina ALD coating, silica ALD coating, or both. In embodiments, the first ALD coating layer 130 may comprise an $MgF_2$ ALD coating that may have a thickness of from 0.25 nm to 5 nm, and the second ALD coating layer 140 may be a silica ALD coating that is a capping layer and has a thickness of from 1 nm to 10 nm. The cushion layer comprising the $MgF_2$ ALD may be disposed between the optical component 101 and the capping layer comprising the silica ALD coating. In embodiments, the second ALD coating layer 140 may be an alumina ALD coating that is a capping layer and may have a thickness of from 0.35 nm to 10 nm.

In embodiments, the coated optical component 100 may comprise, consist of, or consist essentially of the optical component 101 and the ALD coating 120 deposited onto and/or in contact with one or more of the surfaces of the optical component 101. In embodiments, the ALD coating 120 may comprise, consist of, or consist essentially of the first ALD coating layer 130 and the second ALD coating layer 140. The first ALD coating layer 130 may consist or consist essentially of the metal fluoride ALD coating and is directly coupled to the surfaces of the optical component (e.g., surfaces 102, 104, and 106 of coated optical component 101 in FIGS. 1A-1D; surfaces 202, 204, 206, and 208 of the coated optical component 200 in FIGS. 3A-3C; surfaces 402, 404, and 406 of the coated optical component 400 in FIG. 4; surface 504 of the high NA objective lens 502 in FIG. 5; or other optical surfaces). The second ALD coating layer 140 may consist of or consist essentially of a metal oxide ALD coating, a metalloid oxide ALD coating, or both, and may be directly coupled to the outer surface 134 of the first ALD coating layer 130 such that the first ALD coating layer 130 is disposed between the surfaces of the optical component 101 and the second ALD coating layer 140. In embodiments, the first ALD coating layer 130 may consist of or consist essentially of magnesium fluoride. In embodiments, the second ALD coating layer 140 may consist of or consist essentially of silica, alumina, or both.

The coated optical components 100, 300, 400, 500, of the present disclosure having the ALD coatings 120 deposited thereon may be used as optical components in various DUV applications, such as in DUV lithography or DUV inspection systems. The coated optical components may be used with lasers having wavelength in the DUV range, such as but not limited to beams having wavelengths of from 190 nm to 266 nm. In embodiments, the coated optical components of the present disclosure may be used with beam wavelengths of greater than 266 nm.

EXAMPLES

The embodiments of coated optical components and ALD process for producing the coated optical components described herein will be further clarified by the following examples.

Example 1

In Example 1, an optical component was coated with a first ALD coating layer and a second ALD coating layer on top of the first ALD coating layer to prepare a coated optical component. The optical component used for Example 1 was the $CaF_2$ prism depicted in FIGS. 1A-1D, which had first surface 102 (e.g., beam entrance and exit surface), first TIR surface 104, and second TIR surface 106. The first surface 102 had a length of 30 mm and a height of 20 mm. The first TIR surface 104 had a length of 20 mm and a height of 20 mm. The second TIR surface 106 had a width of 25 mm and a height of 20 mm.

The first ALD coating layer was an $MgF_2$ ALD coating having a thickness of 4 nm. The $MgF_2$ ALD coating was applied to the first surface 102, the first TIR surface 104, and the second TRI surface 106. The $MgF_2$ ALD coating was prepared according to the ALD processes disclosed herein using an ALD chamber maintained at a reactor temperature of 150° C. The magnesium precursor was $(EtCp)_2Mg$ (i.e., bis(ethylcyclopentadienyl) magnesium). The bubbler temperature was set to 92° C. and the ICP plasma power was 200 W. The metal precursor pulse comprising the $(EtCp)_2Mg$ had a pulse duration of 0.5 seconds followed by a purge with inert gas for 9 seconds. Following the metal precursor pulse and purge, a water pulse having a duration of 40 milliseconds was conducted followed by purging for 8 seconds with inert gas. After the water pulse and purge, the optical component was subjected to a fluorine source pulse comprising a mixture of $SF_6$ and Argon. The $SF_6$/Argon flow ratio was 30/15, and the fluorine source pulse had a duration of 7 seconds. The fluorine source pulse was followed by a purge pulse. The sequence of metal precursor pulse/water pulse/fluorine source pulse was repeated until the thickness of the $MgF_2$ ALD coating attained a thickness of 4 nm.

Figure 7:
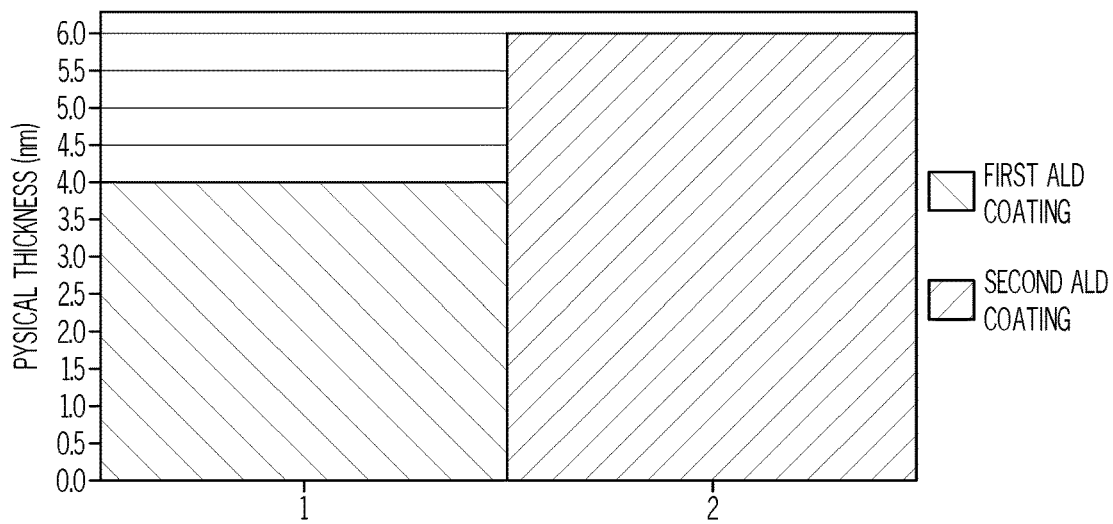
FIG. 7 graphically depicts thickness for each of the first ALD coating layer and second ALD coating layer for the coated optical component of Example 1, according to one or more embodiments shown and described herein.

The second ALD coating layer was a silica ($SiO_2$) ALD coating applied to the outer coating surface of the $MgF_2$ ALD coating layer. The second ALD coating layer had a thickness of 6 nm. The $SiO_2$ ALD coating layer was prepared according to the ALD processes disclosed herein in the ALD chamber maintained at a reactor temperature of 150° C. The silica precursor was an alkylaminosilylamine (ORTHRUS™ alkylaminosilylamine available from Air Liquide). The bubbler temperature was set to 60° C. and the ICP plasma power was 300 W. The optical component was first exposed to a silica precursor pulse having a pulse duration of 0.4 seconds, the silica precursor pulse comprising the silica precursor. The silica precursor pulse was followed by an 8 second purge with inert gas. Throughout the Examples, Argon (Ar) was used as the inert gas for purging the ALD chamber. Following the silica precursor pulse and purge, the optical component was subjected to an $O_2$ plasma pulse comprising $O_2$ plasma and Argon. The $O_2$ plasma pulse had an $Ar/O_2$ flow ratio of 35/15. The $O_2$ plasma pulse had a duration of 9 seconds and was followed by a purge of 8 seconds with inert gas. The sequence of silica precursor pulse followed by $O_2$ pulse was repeated until the thickness of the $SiO_2$ ALD coating layer attained a thickness of 6 nm. Referring to FIG. 7, the physical thicknesses of each of the first ALD coating layer and second ALD coating layer are graphically shown. A comparative uncoated optical component having the same shape depicted in FIGS. 1A-1D and same dimensions was used as a comparative example.

The $CaF_2$ prism of Example 1 is used to change laser beam direction of a 193 nm wavelength laser beam. The transmittance of the first surface (e.g., surface 102 which is the beam entrance/exit surface) of the coated optical component of Example 1 was then compared to the transmittance of the first surface of an uncoated $CaF_2$ optical component having the same shape. The first surface of the optical component is the surface through which the laser beam enters and exits the prism. The uncoated $CaF_2$ optical component provides a comparative example. The uncoated optical component and the coated optical component of Example 1 were each irradiated with an ArF laser beam having a wavelength of 193.4 nm, and the transmittance of p-polarization as a function of angle of incidence (AOI) was determined. The transmittance of a surface is defined as the fraction of beam power of the laser beam incident to the first surface 102 that passes through the first surface 102, and is expressed as a percentage. The percentage transmittance can be determined using a spectrophotometer or light transmittance meter according to known methods. For a flat surface, the angle of incidence (AOI) refers to the acute angle between the ArF laser beam path and a line normal to the plane of the surface on which the ArF laser beam is incident.

Figure 8:
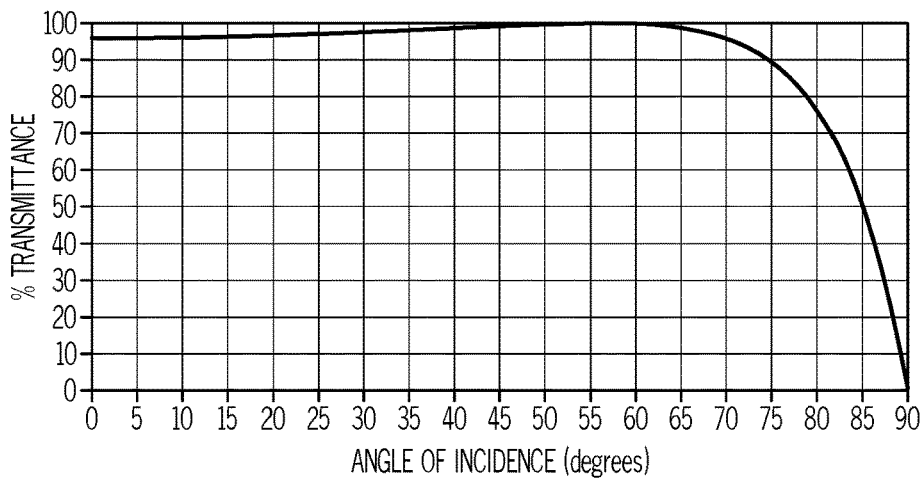
FIG. 8 graphically depicts percentage transmittance (y-axis) as a function of angle of incidence (x-axis) for a comparative uncoated optical component having the same shape as the coated optical component of Example 1; according to one or more embodiments shown and described herein.
Figure 9:
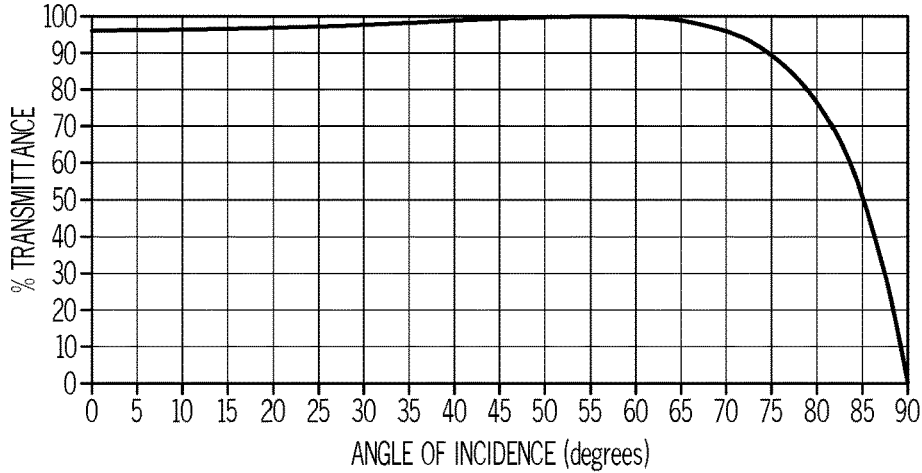
FIG. 9 graphically depicts percentage transmittance (y-axis) as a function of angle of incidence (x-axis) for the coated optical component of Example 1; according to one or more embodiments shown and described herein.

Referring now to FIG. 8, the percentage transmittance (y-axis) as a function of AOI (x-axis) for the comparative uncoated optical component shows 100% transmittance for the p-polarized laser beam at the Brewster angle of 55.6° of the calcium fluoride prism. Referring now to FIG. 9, the percentage transmittance (y-axis) as a function of AOI (x-axis) for the coated optical component of Example 1 also shows 100% transmittance of the p-polarized laser beam at the Brewster angle of 55.6°. This demonstrates that the ALD coating of Example 1 comprising the first ALD coating layer of $MgF_2$ and the second ALD coating layer of silica does not change the transmittance of the beam through the first surface (e.g., beam entrance/exit surface) compared to the comparative uncoated optical component having the same shape.

Figure 10:
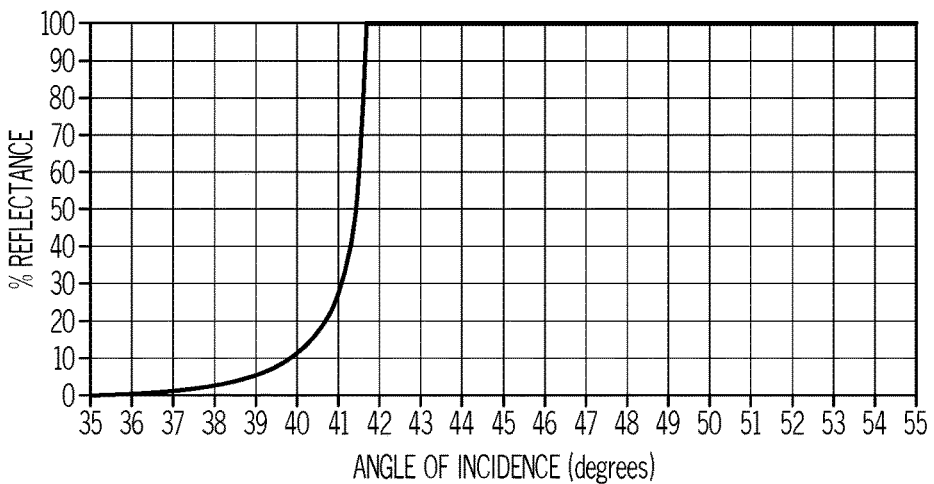
FIG. 10 graphically depicts percentage internal reflectance (y-axis) as a function of angle of incidence (x-axis) for the comparative uncoated optical component having the same shape as the coated optical component of Example 1; according to one or more embodiments shown and described herein.
Figure 11:
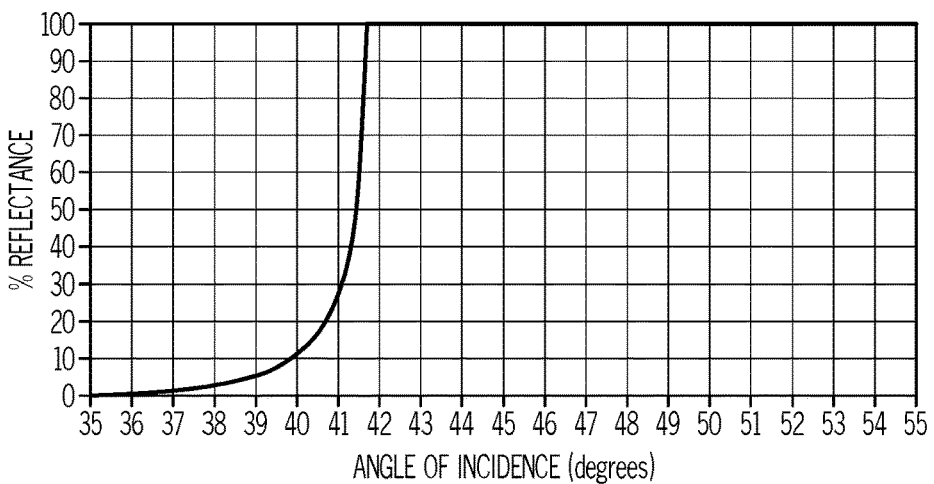
FIG. 11 graphically depicts percentage internal reflectance (y-axis) as a function of angle of incidence (x-axis) for the coated optical component of Example 1; according to one or more embodiments shown and described herein.

For the coated optical component of Example 1 and the comparative uncoated optical component, the internal reflectance of p-polarization of the 193.4 nm wavelength ArF laser beam as a function of TIR angle of incidence (AOI) was determined for the TIR surfaces (e.g., first TIR surface 104 and second TIR surface 106 in FIG. 1A). The internal reflectance of a surface is defined as a fraction of beam power of the laser beam incident to the TIR surface that is reflected by the TIR surface, and is expressed as a percentage. The internal reflectance can be determined using a using a spectrophotometer or light transmittance meter according to known methods. FIG. 10 graphically depicts the percentage of internal reflectance (y-axis) as a function of AOI (x-axis) for the comparative uncoated optical component, and FIG. 11 graphically depicts the percentage of internal reflectance (y-axis) as a function of TIR AOI (x-axis) for the coated optical component of Example 1. In FIGS. 10 and 11, the TIR AOI refers to the acute angle between the ArF laser beam path through the optical component and a line normal to the plane of the TIR surface. The TIR AOI is relative to the TIR surface, not the first surface at which the laser beam is first incident on the optical component. A total internal reflectance at the TIR surface occurs when the TIR AOI from the $CaF_2$ side is greater than the critical angle, which is 41.7 degrees for $CaF_2$. A comparison of FIGS. 10 and 11 indicates that the ALD coating of Example 1 comprising the first ALD coating layer of $MgF_2$ and the second ALD coating layer of silica does not change the internal reflectance of the TIR surfaces of the coated optical component compared to the TIR surfaces of comparative uncoated optical component having the same shape.

Example 2

In Example 2, an optical component was coated with a first ALD coating layer and a second ALD coating layer on top of the first ALD coating layer to prepare a coated optical component. The optical component used for Example 2 was a $CaF_2$ prism having the shape of the prism 200 depicted in FIGS. 3A-3D, which included an entrance surface 202 and an exit surface 204 at the Brewster angle, a first TIR surface 206 at an angle of incidence of 56.1°, and a second TIR surface 208 having an angle of incidence of 45°. The longest dimension of the $CaF_2$ prism of Example 2 was less than 20 mm. The first ALD coating layer was an $MgF_2$ ALD coating having a thickness of 4 nm. The $MgF_2$ ALD coating was formed according to the method and conditions described in Example 1.

The second ALD coating layer was an alumina ($Al_2O_3$) ALD coating applied to the outer coating surface of the first ALD coating layer. The second ALD coating layer had a thickness of 6 nm. The second ALD coating layer comprising the alumina ALD coating was applied in the ALD chamber maintained at a reactor temperature of 150° C. The alumina precursor was trimethylaluminum (TMA). The bubbler temperature was set to room temperature. The optical component was first exposed to an alumina precursor pulse having a pulse duration of 40 milliseconds, the alumina precursor pulse comprising the alumina precursor. The alumina precursor pulse was followed by a 10 second purge with inert gas. Following the alumina precursor pulse and purge, the optical component was subjected to water pulse comprising water. The water pulse had a duration of 40 milliseconds and was followed by a purge of 7 seconds with inert gas. The sequence of alumina precursor pulse followed by the water pulse was repeated until the thickness of the alumina ALD coating layer attained a thickness of 6 nm. A comparative uncoated optical component having the same shape depicted in FIG. 3A and same dimensions was used as a comparative example.

Figure 12:
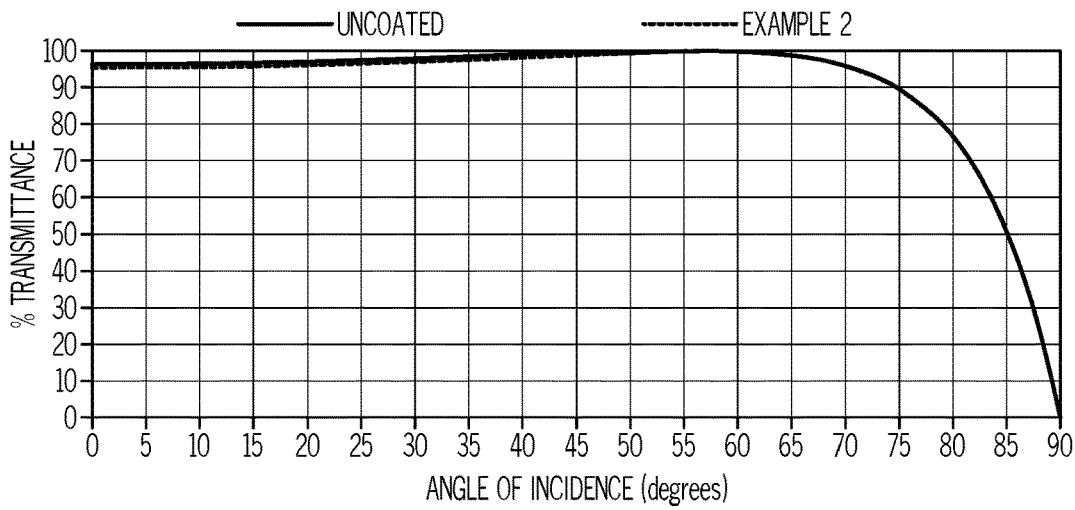
FIG. 12 graphically depicts percentage transmittance (y-axis) as a function of angle of incidence (x-axis) for the coated optical component of Example 2 and a comparative uncoated optical component having the same shape; according to one or more embodiments shown and described herein.

The $CaF_2$ prisms of Example 2 were employed to change the direction of a laser beam having wavelength of 213 nm. The comparative uncoated optical component and the coated optical component of Example 2 were each irradiated with an ArF laser beam having a wavelength of 213 nm, and the transmittance and internal reflectance of p-polarization of the ArF laser beam as a function of angle of incidence (AOI) were measured according to the methods disclosed herein. Referring to FIG. 12, the percentage transmittance of the comparative uncoated optical component is shown by the solid line and the percentage transmittance for the coated optical component of Example 2 is shown by a dashed line. As shown in FIG. 12, the percentage transmittance of the coated optical component of Example 2 corresponds closely to the percentage transmittance of the comparative uncoated optical component. This demonstrates that the ALD coating of Example 2 comprising the first ALD coating layer of $MgF_2$ and the second ALD coating layer of alumina does not substantially change the transmittance of the 213 nm beam through the first surface (e.g., beam entrance and exit surface) compared to the comparative uncoated optical component having the same shape.

Figure 13:
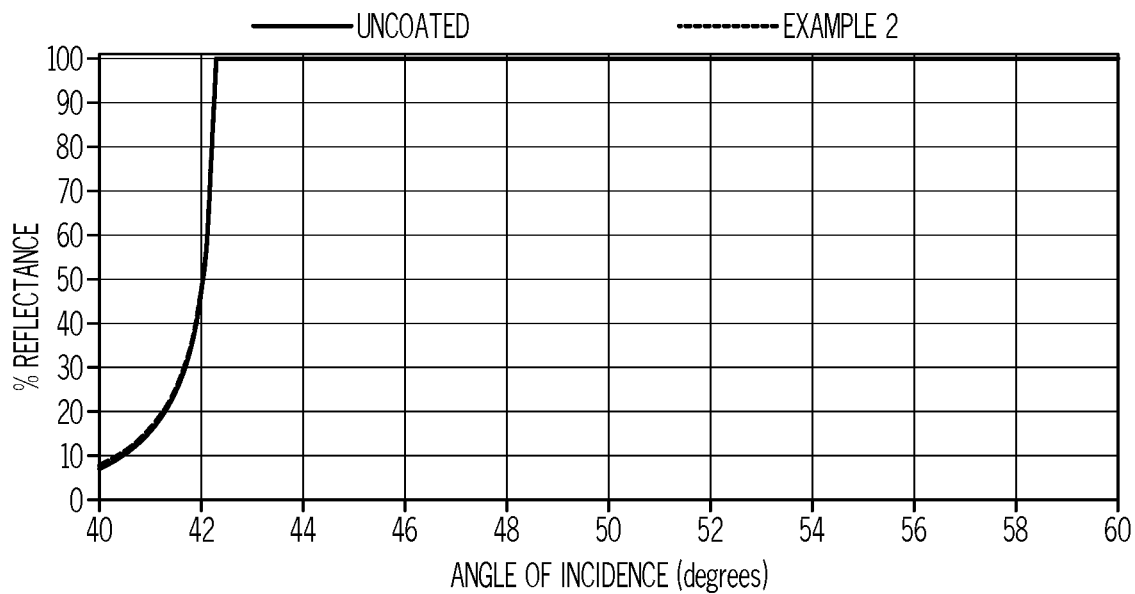
FIG. 13 graphically depicts percentage internal reflectance (y-axis) as a function of angle of incidence (x-axis) for the coated optical component of Example 2 and for a comparative uncoated optical component having the same shape; according to one or more embodiments shown and described herein.

Referring now to FIG. 13, the percentage internal reflectance of the 213 nm beam for TIR surface 206 of the comparative uncoated optical component is shown by the solid line and the percentage internal reflectance of the 213 nm beam for TIR surface 206 of the coated optical component of Example 2 is shown by a dashed line. As shown in FIG. 13, the percentage internal reflection of the coated optical component of Example 2 corresponds closely to the percentage internal reflection of the comparative uncoated optical component. This demonstrates that the ALD coating of Example 2 comprising the first ALD coating layer of $MgF_2$ and the second ALD coating layer of alumina does not substantially change the internal reflection of the 213 nm beam by the TIR surfaces of the coated optical component (e.g., beam entrance and exit surface) compared to the TIR surfaces of the comparative uncoated optical component having the same shape.

Example 3

In Example 3, an optical component was coated with a first ALD coating layer and a second ALD coating layer on top of the first ALD coating layer to prepare an uncoated optical component. The optical component used for Example 3 was a $CaF_2$ prism having the shape of the right angle prism 400 depicted in FIG. 4, which included an entrance surface 402, an exit surface 404, and one TIR surface 406 (hypotenuse side). The height the right angle prism of Example 3 was less than 10 mm. An ALD-based protective anti-reflective (AR) coating was applied to all three of surfaces 402, 404, and 406. The ALD coating included an $MgF_2$ ALD coating with thickness of 4 nm deposited directly onto the $CaF_2$ prism, followed by four additional coating layers. The four additional coating layers comprised a 19 nm thick $Al_2O_3$ ALD coating layer, a 52 nm thick $SiO_2$ ALD coating layer, a 41 nm thick $Al_2O_3$ ALD coating layer, and a 45 nm $SiO_2$ ALD coating layer. The $MgF_2$ ALD coating layer and the $SiO_2$ ALD coating layers were applied according to the method and conditions described in Example 1. The $Al_2O_3$ ALD coating layers were applied according to the method of Example 2. The prism is used to couple a laser beam having wavelength of 266 nm into an objective lens of an inspection system. A comparative uncoated optical component having the same shape depicted in FIG. 4 and the same dimensions was used as a comparative example.

Figure 14:
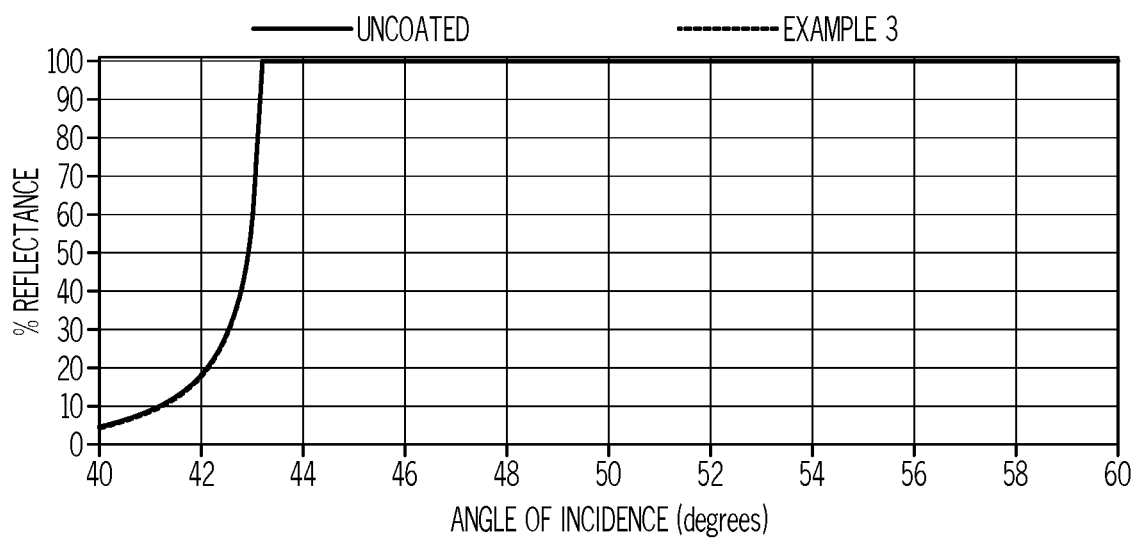
FIG. 14 graphically depicts percentage internal reflectance (y-axis) as a function of angle of incidence (x-axis) for the coated optical component of Example 3 and for a comparative uncoated optical component having the same shape; according to one or more embodiments shown and described herein.

The comparative uncoated optical component and the coated optical component of Example 3 were each irradiated with an ArF laser beam having a wavelength of 266 nm, and the internal reflectance of p-polarization of the ArF laser beam as a function of angle of incidence (AOI) at the TIR surface 406 was measured according to the methods disclosed herein. Referring now to FIG. 14, the percentage internal reflectance of the comparative uncoated optical component is shown by the solid line and the percentage internal reflection for the coated optical component of Example 3 is shown by a dashed line. As shown in FIG. 14, the percentage internal reflection of the coated optical component of Example 3 corresponds closely to the percentage internal reflection of the comparative uncoated optical component, as shown by the overlap of the dashed and solid lines in FIG. 14. This demonstrates that the ALD coating of Example 3 comprising the first ALD coating layer of $MgF_2$ and the second oxide ALD coating layers (alternating alumina and silica) does not substantially change the internal reflection of the 266 nm beam by the TIR surface.

Figure 15:
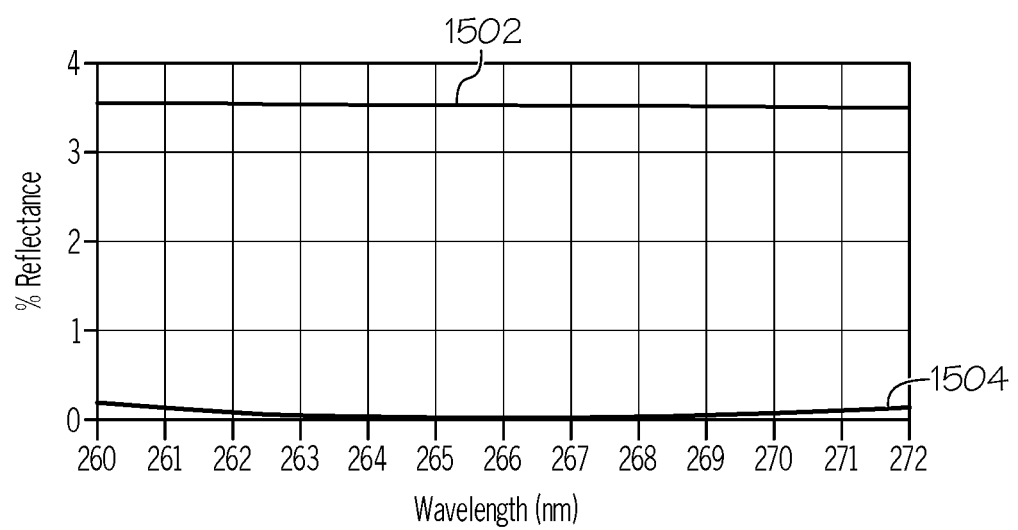
FIG. 15 graphically depicts percentage surface reflectance of the entrance surface (y-axis) as a function of wavelength of incident light (x-axis) for the coated optical component of Example 3 and for a comparative uncoated optical component having the same shape; according to one or more embodiments shown and described herein.

The ALD coating of Example 3 was shown to reduce the reflectance loss on the entrance surface 402 and exit surface 404 compared to the comparative uncoated optical component having the same shape. Referring now to FIG. 15, the % reflectance of the entrance surface 402 as a function of wavelength of light incident on the entrance surface 402 is graphically depicted. In FIG. 15, reference number 1502 refers to the reflectance of the comparative uncoated optical component, and reference number 1504 refers to the reflectance of the ALD coated optical component of Example 3. As shown in FIG. 15, for the entrance surface 402, the ALD protective AR coating of Example 3 (ref. no. 1504) reduces surface reflectance to less than 0.2% compared to the surface reflectance of 3.5% for the comparative uncoated optical component (ref. no. 1502).

Example 4

$MgF_2$ ALD Coating Applied Using $SF_6$/ArPlasma as the Fluorine Source

In Example 4, a $CaF_2$ optical component was coated with an $MgF_2$ ALD coating using $SF_6$/Ar plasma as the fluorine source. The optical component for Example 4 was a right angle prism similar to the right angle prism of FIG. 4 having dimensions of from 10 mm to 30 mm. The ALD process for Example 4 comprises exposing the $CaF_2$ optical component to alternating pulses of the magnesium precursor and $SF_6$/Ar plasma. In Example 4, the optical component was not subjected to an oxygen source pulse between the magnesium precursor pulse and the fluorine source pulse. The ALD process was conducted while maintaining the ALD chamber at a temperature of 150° C. The magnesium precursor was $(EtCp)_2Mg$ (i.e., bis(ethylcyclopentadienyl) magnesium). The magnesium precursor was heated to 95° C. and the optical component was exposed to the magnesium precursor for 1 second during each pulse of the magnesium precursor to achieve saturation of the surface. After the magnesium precursor pulse, the ALD chamber was purged with inert gas (Ar, N2) to remove any remaining magnesium precursor. The optical component was then exposed to the $SF_6$/Ar plasma fluorine pulse. The power of the current used to generate the $SF_6$/Ar plasma was 200 W, and the flow rate ratio of Ar to $SF_6$ was 2:1, where flow rates are volumetric flow rates expressed in units of sccm. The duration of the $SF_6$/AR plasma fluorine pulse was 7 s.

Example 5

$MgF_2$ ALD Coating Applied Using $SF_6$/Ar Plasma as the Fluorine Source and Including an $H_2O$ Pulse For Example 5, a $CaF_2$ optical component was coated with an $MgF_2$ ALD coating using $SF_6$/Ar plasma as the fluorine source and an oxygen source pulse between the magnesium precursor pulse and the fluorine source pulse. The $CaF_2$ optical component for Example 5 was the same as the $CaF_2$ optical component described in Example 4. The ALD process for Example 5 included exposing the $CaF_2$ optical component to a pulse containing the magnesium precursor, a second pulse comprising an oxygen source, and a third pulse comprising the $SF_6$/Ar plasma. Thus, in Example 5, the magnesium precursor is first converted to magnesium oxide with the oxygen source, and the magnesium oxide is then converted to $MgF_2$ by the $SF_6$/Ar plasma (fluorine source). The magnesium precursor pulse and fluorine source pulse were the same as previously described in Example 4. For the oxygen source pulse, water (H$_2$O) was used as the oxygen source. After exposure to the magnesium precursor, the optical component was exposed to the oxygen source pulse having a duration of 0.3 seconds. The optical component was then exposed to the fluorine source after the oxygen source. The ALD chamber was maintained at a temperature of 150° C. throughout the ALD process and was purged with the inert gas between each pulse.

Example 6

XPS Analysis of the MgF$_2$ ALD Coatings of Examples 4 and 5

In Example 6, the MgF$_2$ ALD coatings of each of Examples 4 and 5 were analyzed by X-Ray Photoelectron Spectroscopy (XPS) to ascertain the relative concentrations of different chemical elements located at the surface of the MgF$_2$ ALD coating. In order to accurately quantify the surface concentrations of various elements in the MgF$_2$ ALD coating using x-ray photoelectron spectroscopy (XPS), relative sensitivity factors were employed that were derived from standard reference materials. The analysis volume for the XPS measurement of the ALD coating is the product of the analysis area (XPS spot size or aperture size at the surface of the ALD coating) and the depth of the ALD coating probed. Photoelectrons are generated within the x-ray penetration depth of the ALD coating (typically many microns), but only the photoelectrons that have sufficient kinetic energy to escape the surface of the ALD coating (approximately three times the photoelectron escape depth) are detected. The photoelectron escape depths are on the order of 15-35 Å, which leads to an analysis depth of approximately 50-100 Å. Typically, 95% of the signal originates from within this depth. An electron energy analyzer and detector were used to collect and measure the kinetic energy of the photoelectrons emitted from the surface of the ALD coating. The specific kinetic energy of each emitted photoelectron is a unique signature of the element and core electronic level from which it originated in a particular bonding configuration of the element. The number of emitted photoelectrons are counted (signal intensity) and plotted as a function of kinetic energy to create a photoelectron spectrum. Peaks in the spectrum are unique to core electronic levels of individual elements. The area under each peak is integrated and then divided by the appropriate relative sensitivity factor (derived from standard reference materials) in order to quantify the atom fraction of each element in the analysis volume of the ALD coating. When analyzing data by XPS from the ALD coatings, there are multiple XPS lines associated with each element, one for each core electronic level in each particular bonding configuration of the element. The atomic percentages of elements in the MgF$_2$ ALD coatings are provided in Table 1. For elements with low concentration, the XPS line with the highest signal to noise ratio should be used. The surfaces of the ALD coatings may be cleaned by UV/ozone, alcohols or other non-aqueous measures. The photoelectron spectra in various energy ranges for the MgF$_2$ coatings of Examples 4 and 5 are provided in FIGS. 16, 17, and 18. The photoelectron spectra of FIGS. 16, 17, and 18 are reported in terms of binding energy, where the binding energy is equal to hv-KE, where hv is the photon energy and the term KE is the measured kinetic energy of the emitted electrons.

Figure 16:
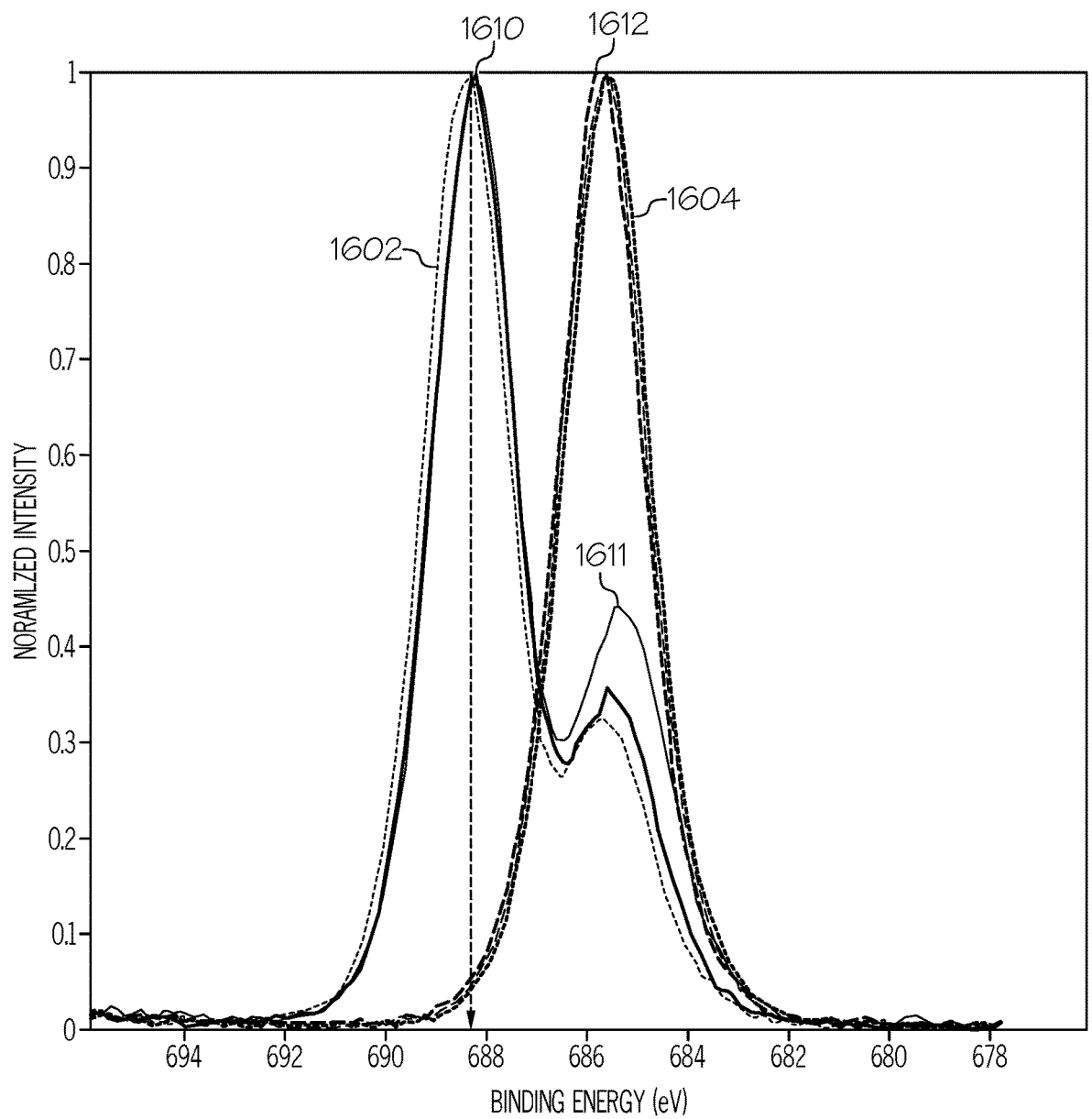
FIG. 16 graphically depicts normalized intensity (y-axis) as a function of fluorine 1s bonding energy (x-axis) determined through X-Ray Photoelectron Spectroscopy for the $MgF_2$ ALD coatings of Examples 4 and 5, according to one or more embodiments shown and described herein.

Referring to FIG. 16, the photoelectron spectra in an energy range indicative of the 1 s core electronic level of fluorine is graphically depicted for the MgF$_2$ ALD coating of Example 4 (reference no. 1602) and for the MgF$_2$ ALD coating of Example 5 (reference no. 1604). As shown in FIG. 16, the photoelectron spectra for the MgF$_2$ ALD coating of Example 4 (ref. no. 1602) has a major peak at around 688 eV (ref. no. 1610) and a minor peak at around 685 eV (ref. no. 1611). The major peak 1610 indicates significant bonding between fluorine and organic constituents, such as carbon or fragments of the ligands, and the minor peak 1611 is indicative of fluorine bonds to inorganic species, such as the magnesium. In contrast, the photoelectron spectra for the MgF$_2$ ALD coating of Example 5 (ref. no. 1604) exhibits a single peak at around 685 eV (ref no. 1612), which indicates that substantially all of the fluorine bonds to inorganic constituents, such as the magnesium, and very few fluorine-carbon bonds are present.

Figure 17:
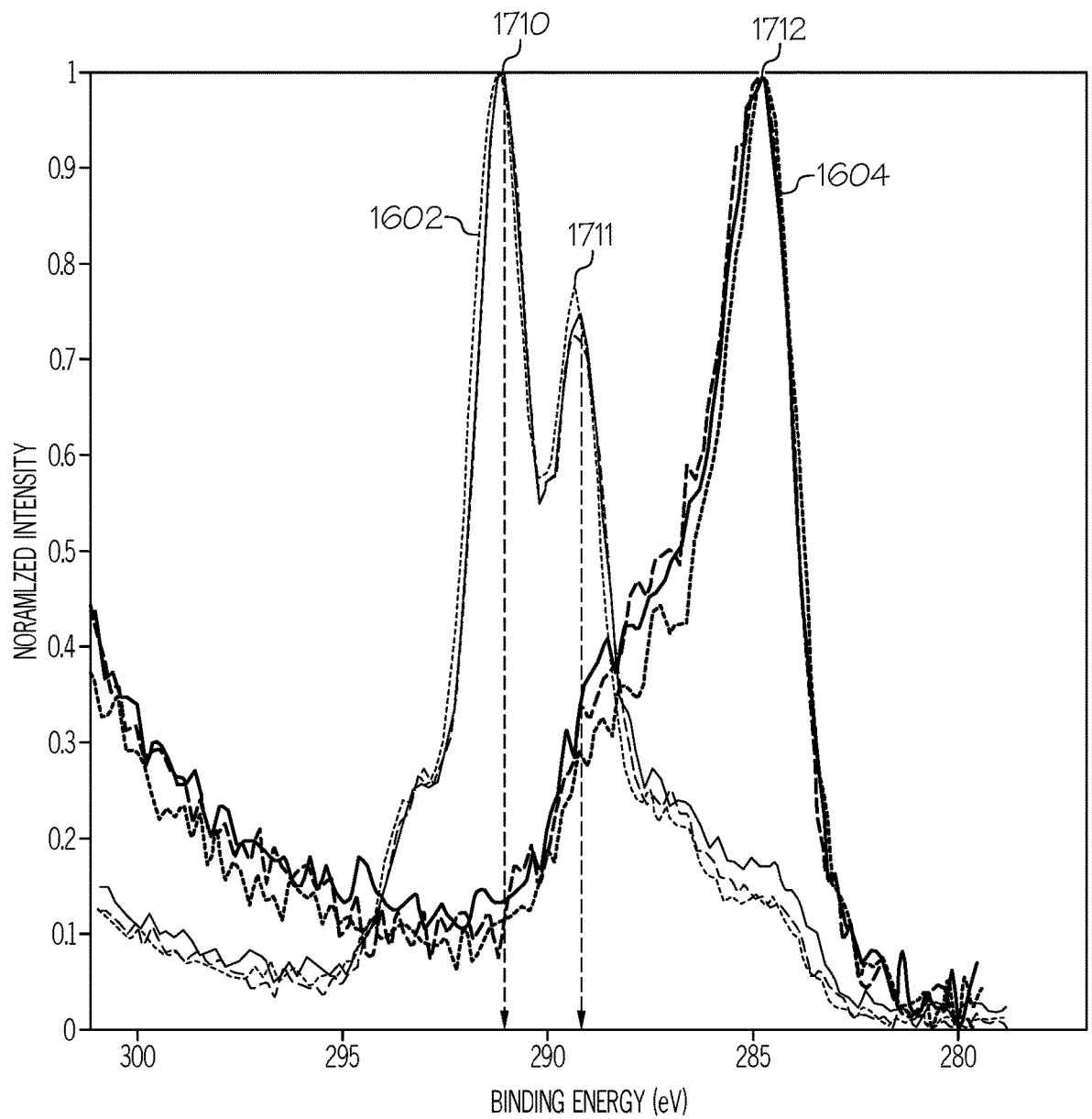
FIG. 17 graphically depicts normalized intensity (y-axis) as a function of carbon 1s bonding energy (x-axis) determined through X-Ray Photoelectron Spectroscopy for the $MgF_2$ ALD coatings of Examples 4 and 5, according to one or more embodiments shown and described herein.

Referring now to FIG. 17, the photoelectron spectra in an energy range indicative of the 1 s core electronic level of carbon is graphically depicted for the MgF$_2$ ALD coating of Example 4 (reference no. 1602) and for the MgF$_2$ ALD coating of Example 5 (reference no. 1604). As shown in FIG. 17, the photoelectron spectra for the MgF$_2$ ALD coating of Example 4 (ref. no. 1602) has a major peak at around 291 eV (ref. no. 1710) and a minor peak at around 289 eV (ref. no. 1711). The major peak 1710 indicates significant bonding of carbon to two fluorine atoms (CF$_2$), and the minor peak 1711 is indicative of a carbon atom bonded to fluorine and hydrogen (CF$_y$H$_z$). In contrast, the photoelectron spectra for the MgF$_2$ ALD coating of Example 5 (ref. no. 1604) exhibits a single peak at around 285 eV (ref. no. 1712), which indicates that substantially all of the carbon is in the form of carbon-carbon bonds, with very little bonding between carbon and fluorine. Thus, FIGS. 16 and 17 indicate (1) that the MgF$_2$ ALD coating of Example 5 prepared by incorporating the oxygen source pulse between the magnesium precursor pulse and fluorine source pulse has less fluorine-carbon bonding compared to the MgF$_2$ ALD coating of Example 4 without the oxygen source pulse; (2) that substantially all of the fluorine in the MgF$_2$ ALD coating of Example 5 is bonded to Mg; and (3) that the carbon detected in the MgF$_2$ ALD coating of Example 5 is not incorporated internally in the MgF$_2$ ALD coating, but rather forms isolated regions on the surface.

Figure 18:
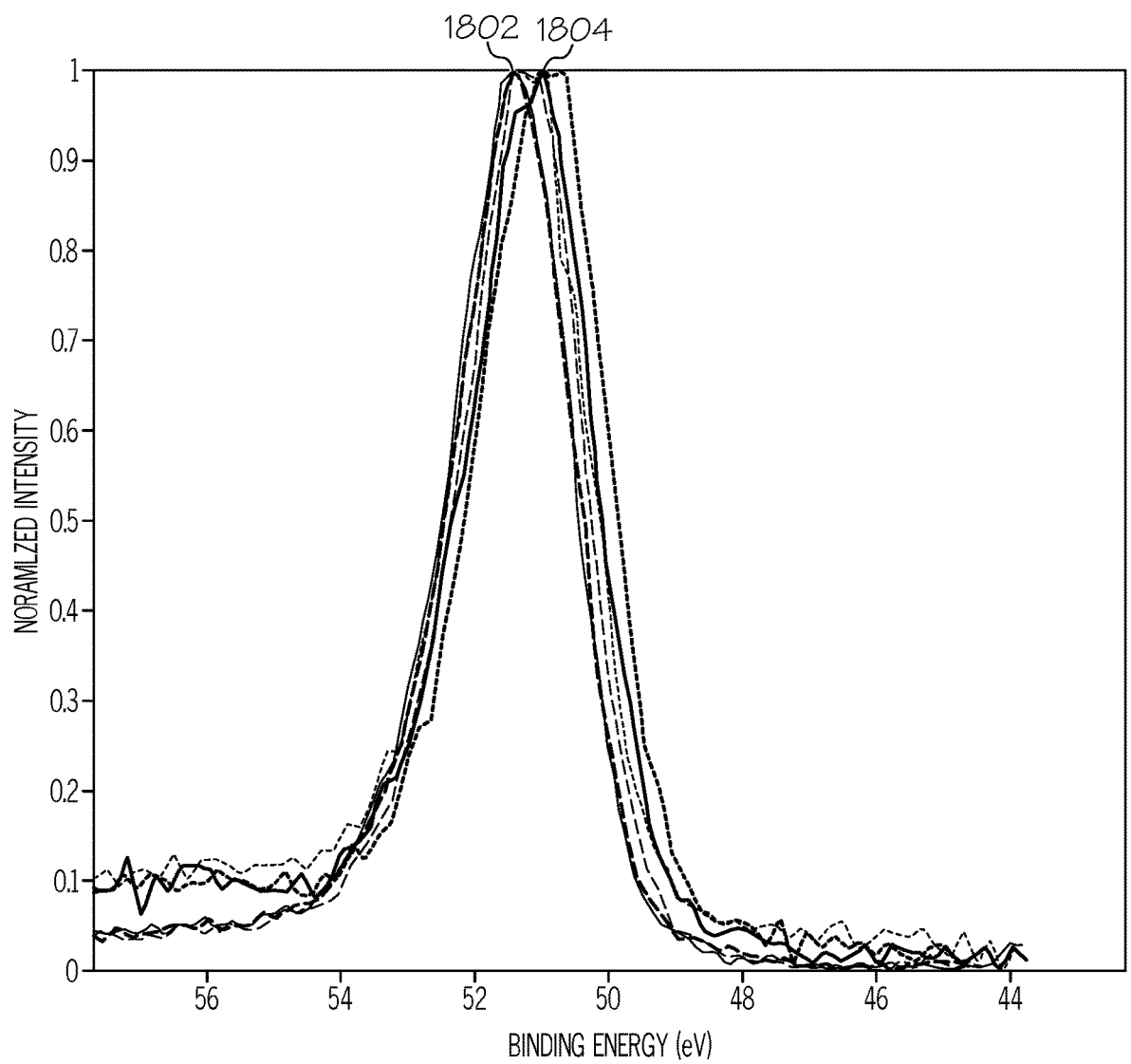
FIG. 18 graphically depicts normalized intensity (y-axis) as a function of magnesium 2p bonding energy (x-axis) determined through X-Ray Photoelectron Spectroscopy for the MgF$_2$ ALD coatings of Examples 4 and 5, according to one or more embodiments shown and described herein.

Referring now to FIG. 18, the photoelectron spectra in an energy range indicative of 2p core electronic level of magnesium is graphically depicted for the MgF$_2$ ALD coating of Example 4 and for the MgF$_2$ ALD coating of Example 5. Peak 1802 in FIG. 18 represents magnesium bonds having greater bonding energy and indicates bonding of magnesium to fluorine. Peak 1804 in FIG. 18 represents magnesium bonds having lower bonding energy and corresponds to magnesium-oxygen and/or magnesium-carbon bonding. Mg2p data shows asymmetric peaks strongly suggestive of two different Mg species. Peaks having high bonding energy indicate MgF$_2$. The lower bonding energy with asymmetric peak (right shifted) indicates MgF$_2$ with oxygen and carbon hydrogen included film.

The photoelectron spectra were used to determine the atomic percentages of each of magnesium, fluorine, carbon, and oxygen in the analysis volume of the MgF$_2$ ALD coatings of Examples 4 and 5. The atomic percentages are provided in Table 1. As shown in Table 1, the MgF$_2$ ALD coating of Example 5 had a lesser percentage of carbon and greater percentage of magnesium compared to the MgF$_2$ ALD coating of Example 4. Thus, when using an SF$_6$-based fluorine source, the concentration of carbon in the MgF$_2$ ALD coating can be reduced as in Example 5 by incorporating the oxygen source pulse between the magnesium precursor pulse and the fluorine source pulse.

TABLE 1

| Example | Magnesium (atomic %) | Fluorine (atomic %) | Carbon (atomic %) | Oxygen (atomic %) |
|---|---|---|---|---|
| Example 4 | 10 | 62 | 27 | 1 |
| Example 5 | 28 | 58 | 9 | 5 |

Comparative Example 7

Optical Component with PVD MgF$_2$ Coating

In Comparative Example 7, a comparative coated optical component was prepared by coating a crystalline CaF$_2$ optical component with an MgF$_2$ coating using physical vapor deposition (PVD). In the PVD process, MgF$_2$ was thermally evaporated from a resistance source in a vacuum chamber to provide an evaporated MgF$_2$ flux. The evaporated MgF$_2$ flux was then directed in a line-of-sight manner towards the optical component. As a result, the PVD process of Comparative Example 7 was only able to coat one surface of a multi-surface optical component at a time.

Example 8

MgF$_2$ ALD Coatings Prepared with Different Fluorine Sources

In Example 8, coated optical components having MgF$_2$ ALD coatings prepared using different fluorine sources were prepared. The optical components in Example 8 were the same in composition and shape as the optical components used for Comparative Example 7. For Sample 8A, the MgF$_2$ ALD coating was prepared using HF as the fluorine source. The MgF$_2$ ALD coating of Sample 8A was applied using the magnesium precursor and ALD process described in Example 4, except for using HF in place of the SF$_6$/AR plasma for the fluorine source. The reactor temperature of the ALD chamber was 150° C. The magnesium precursor pulse was conducted according to the method and operating conditions described in Example 4. The HF pulse had a pulse duration of 1 second and was followed by purging with the inert gas.

For Sample 8B, the MgF$_2$ ALD coating was prepared using an organic fluorine compound as the fluorine source. The MgF$_2$ ALD coating of Sample 8B was applied using the magnesium precursor and ALD process described in Example 4, except for using the organic fluorine source in place of the SF$_6$/Ar plasma for the fluorine source. The organic fluorine source for preparing Sample 8B was hexafluoroacetylacetone.

For Sample 8C, the MgF$_2$ ALD coating was prepared using SF$_6$/Ar plasma as the fluorine source and including an oxygen source pulse between the magnesium precursor pulse and the fluorine source pulse. The MgF$_2$ ALD coating of Sample 8C was applied using the materials and ALD process described in Example 5.

Figure 19:
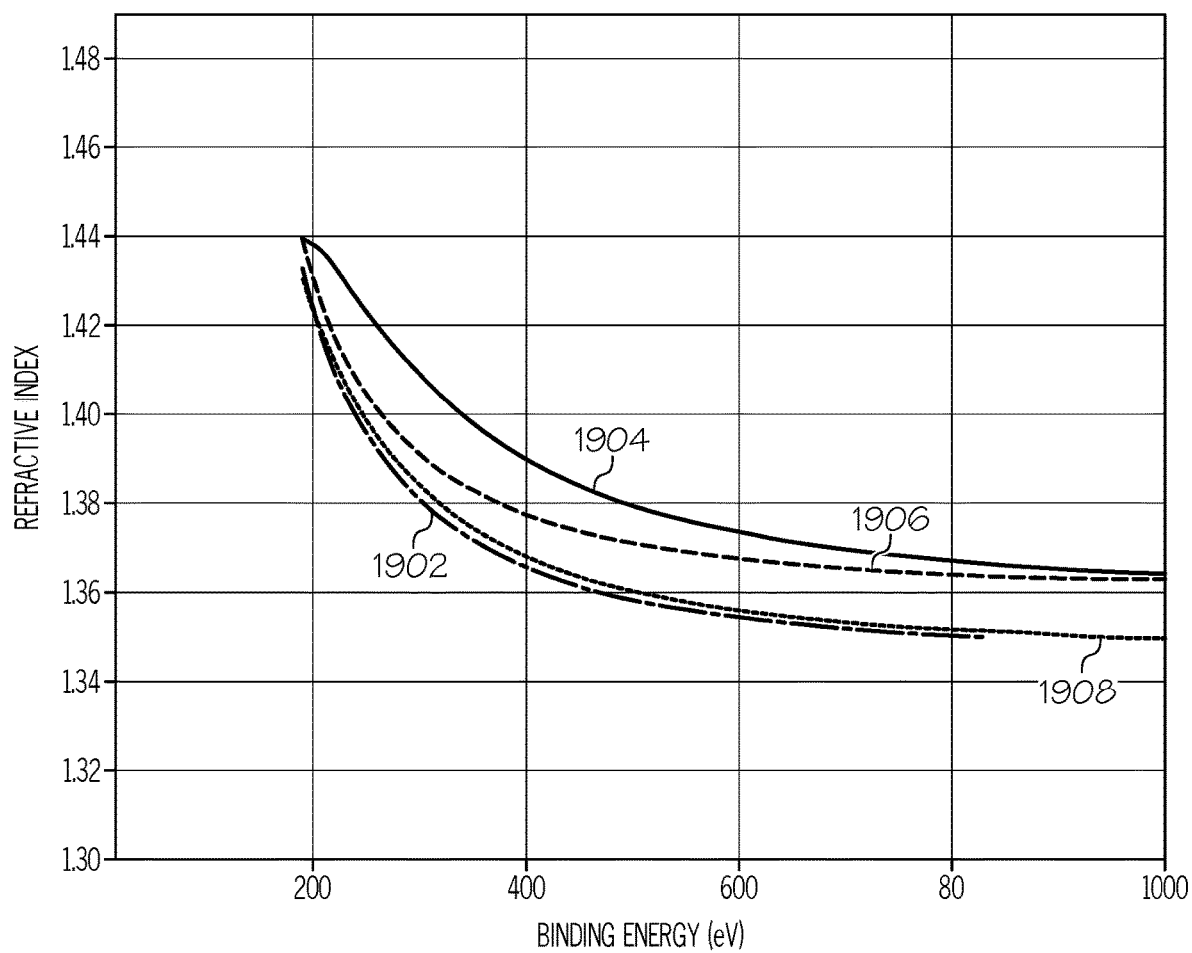
FIG. 19 graphically depicts refractive index (y-axis) as a function of wavelength (x-axis) for coated optical components prepared by various ALD processes and PVD processes, according to one or more embodiments shown and described herein.

Referring now to FIG. 19, the refractive index of each of the coated optical components of Example 8 and Comparative Example 7 as a function of wavelength, as measured using a refractometer according to known methods, is graphically depicted. In FIG. 19, reference number 1902 corresponds to Comparative Example 7, reference number 1904 corresponds to the refractive index curve for Sample 8A prepared using HF, reference number 1906 corresponds to the refractive index curve for Sample 8B prepared using an organic fluorine source, and reference number 1908 corresponds to the refractive index curve for Sample 8C using SF$_6$/Ar plasma. As shown in FIG. 19, the coated optical component of Sample 8C (1908), which was prepared using SF6SF$_6$/Ar plasma with the additional oxygen source pulse, exhibited lower refractive index values compared to the coated optical components of Sample 8A (1904) and Sample 8B (1906). The refractive index values of the coated optical component of Sample 8C was comparable to the refractive index values of the coated optical component of Comparative Example 7. This demonstrates that preparing a coated optical component having an ALD coating prepared by an ALD process using an SF$_6$-based fluorine source and having an intermediate oxygen source pulse step can produce a coated optical component having refractive index comparable to existing PVD coated optical components.

Figure 20:
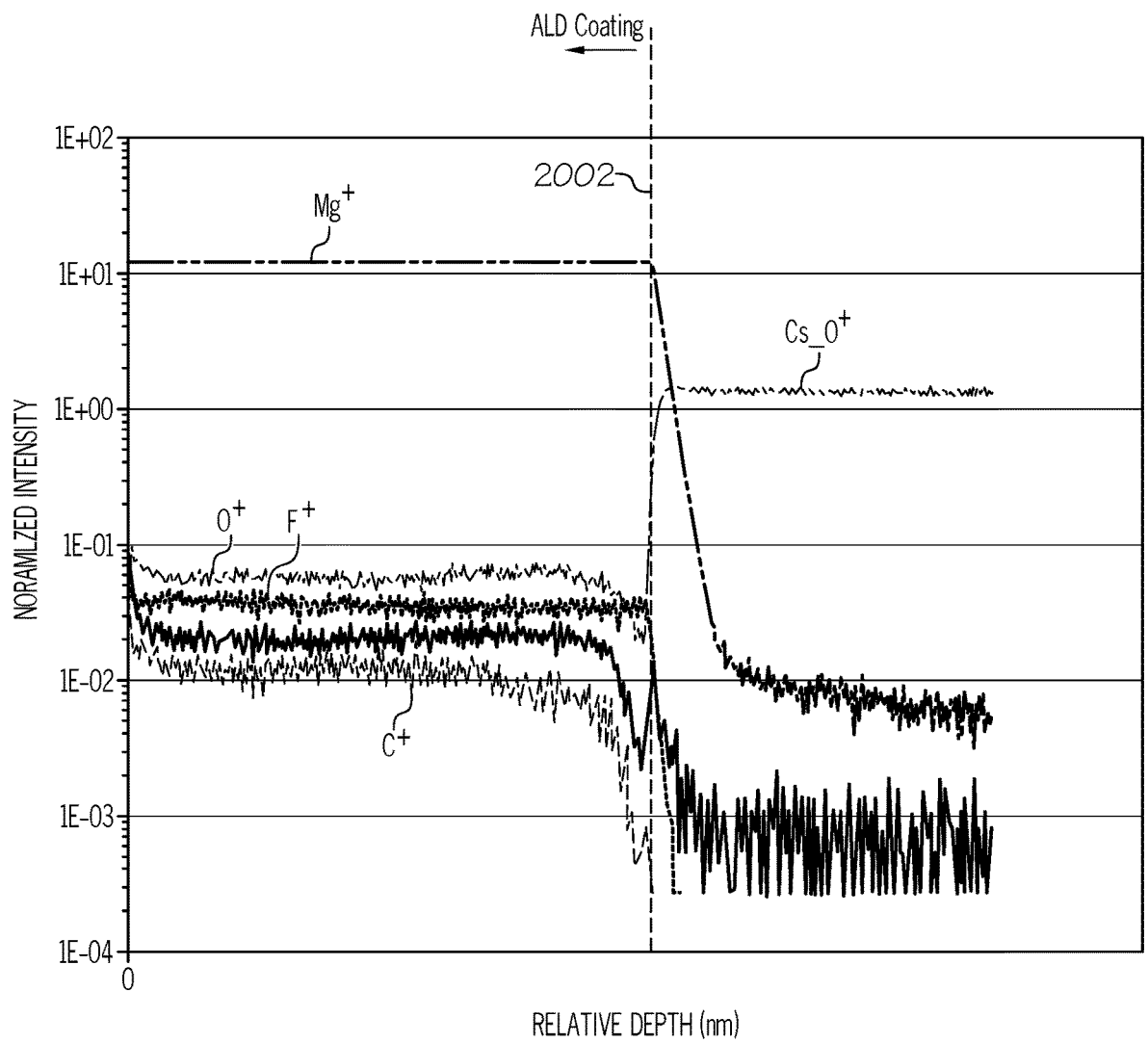
FIG. 20 graphically depicts normalized intensity (y-axis) as a function of depth in the coating (x-axis) for various atomic constituents of the PVD coating of Comparative Example 7.
Figure 21:
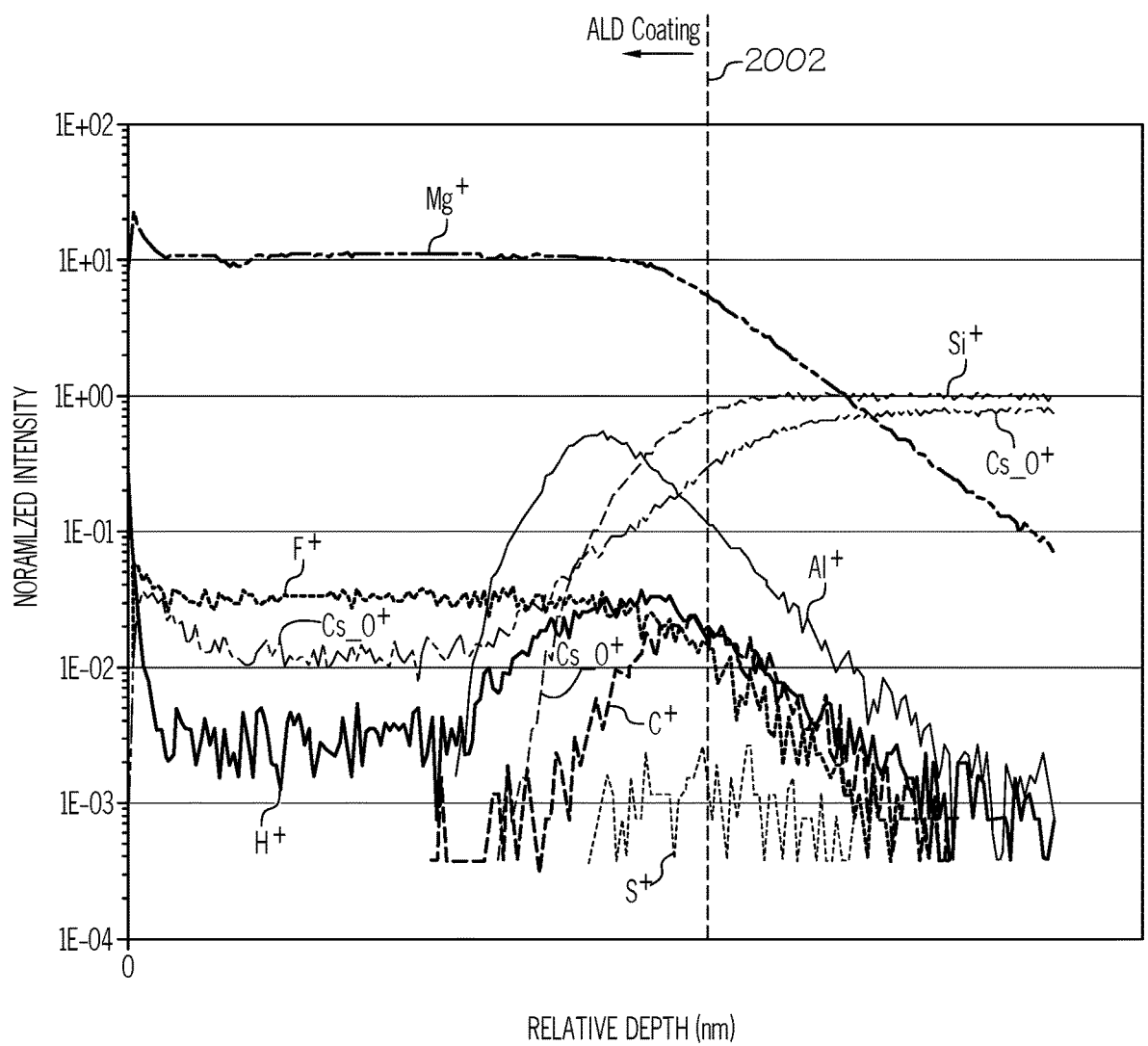
FIG. 21 graphically depicts normalized intensity (y-axis) as a function of depth in the coating (x-axis) for various atomic constituents of the ALD coating of the ALD coated optical component of Sample 9C of Example 8, according to one or more embodiments shown and described herein.

Referring now to FIGS. 20 and 21, the relative amounts of carbon, magnesium, oxygen, and fluorine as a function of depth in the coating is provided for the coated optical component of Comparative Example 7 (FIG. 20) and Sample 8C of Example 8 (FIG. 21). The data in FIGS. 20 and 21 were produced through secondary ion mass spectrometry (SIMS) using a secondary ion mass spectrometer. The SIMS analysis was conducted by sputtering the surface of the coating with cesium ions (Cs$^+$) having a kinetic energy of 2 kV and conducting analysis in positive mode with 30 kV Bi$_3^+$ ions. In FIGS. 20 and 21, reference line 2002 indicates the interface between the substrate and the coating with the coating being represented by the data to the left of reference line 2002. As shown in FIG. 21, the ALD coated optical component of Sample 8C exhibited a similar oxygen concentration compared to the PVD coated optical component of Comparative Example 7 (FIG. 20). However, FIG. 21 also shows that the ALD coated optical component of Sample 8C had a lower concentration of carbon impurities compared to the PVD coated optical component of Comparative Example 7.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of coating an optical component, the method comprising depositing an atomic layer deposition (ALD) coating on a surface of the optical component, wherein:
    the optical component comprises crystalline calcium fluoride (CaF$_2$);
    the ALD coating comprises a metal fluoride having a metal that is different from calcium; and
    the ALD coating is applied directly to the crystalline CaF$_2$ and has a thickness of less than or equal to 10 nm.

2. The method of claim 1, wherein the depositing the ALD coating comprises exposing the surface of the optical component to alternating pulses of a metal precursor and a fluorine source comprising sulfur hexafluoride (SF$_6$).

3. The method of claim 2, wherein the fluorine source comprises a plasma formed from sulfur hexafluoride.

4. The method of claim 2, wherein the metal precursor comprises a metal ligand complex comprising magnesium.

5. The method of claim 2, wherein the exposing the surface of the optical component to alternating pulses of a metal precursor and a fluorine source comprises:
- exposing the surface of the optical component to the pulse containing the metal precursor, wherein the metal precursor reacts with the calcium fluoride at the surface of the optical component to deposit a monolayer of ligated metal on the surface of the optical component;
- ceasing the pulse containing the metal precursor;
- exposing the surface of the optical component to the pulse containing the fluorine source, wherein the fluorine source reacts with the monolayer of ligated metal to form the metal fluoride; and
- ceasing the pulse containing fluorine source.

6. The method of claim 5, further comprising:
- after ceasing the pulse containing the metal precursor and before the exposing the surface of the optical component to the pulse containing the fluorine source, exposing the surface to a pulse containing an oxygen source, the oxygen source comprising water, water plasma, oxygen, oxygen plasma, ozone, ozone plasma, hydrogen peroxide, hydrogen peroxide plasma, oxygen-containing liquid, oxygen-containing gas, or combinations of these, wherein the oxygen source causes oxidation of the ligated metal to form a metal oxide; and
- ceasing the pulse containing the oxygen source;

wherein:
- the fluorine source reduces the metal oxide to form the metal fluoride; and
- the pulse containing the oxygen source removes carbon from the monolayer of ligated metal.

7. The method of claim 1, wherein the depositing the ALD coating comprises:
- applying a first ALD coating layer to a surface of the optical component; and
- applying a second ALD coating layer onto the first ALD coating layer, where the second ALD coating layer comprises a material different from the first ALD coating layer.

8. The method of claim 7, wherein the first ALD coating layer is a metal fluoride and the second ALD coating layer is silica or alumina.

* * * * *